United States Patent [19]
Hed

[11] Patent Number: 5,836,669
[45] Date of Patent: Nov. 17, 1998

[54] REMOTE ILLUMINATION AND LIGHT APPORTIONMENT IN APPLIANCES

[75] Inventor: Aharon Zeev Hed, Nashua, N.H.

[73] Assignee: Troy Investments, Inc., Nashua, N.H.

[21] Appl. No.: 587,579

[22] Filed: Jan. 17, 1996

[51] Int. Cl.⁶ .................................................. F21V 33/00
[52] U.S. Cl. .............................. 362/92; 362/26; 362/31; 362/32; 362/91
[58] Field of Search ................................ 362/26, 31, 32, 362/91, 92, 23

[56] References Cited

U.S. PATENT DOCUMENTS

| | | | |
|---|---|---|---|
| 2,737,744 | 3/1956 | Sturges et al. ............................. | 362/23 |
| 3,040,458 | 6/1962 | Mathews ..................................... | 362/23 |
| 4,706,169 | 11/1987 | Bussan et al. ............................. | 362/26 |
| 5,036,435 | 7/1991 | Tokuda et al. ............................. | 362/32 |

*Primary Examiner*—Stephen F. Husar
*Attorney, Agent, or Firm*—Herbert Dubno

[57] ABSTRACT

A space at least partly enclosed by an appliance housing can be illuminated by utilizing at least one lamp outside that space and coupling a light pipe system to that lamp so that light can be conducted into the space by a light-transmission system. Within the space light is emitted from one or more light extractors optically coupled to the light-transmission system. The light extractors are in the form of wave guides provided along a surface with formations or the like from which light is emitted.

37 Claims, 12 Drawing Sheets

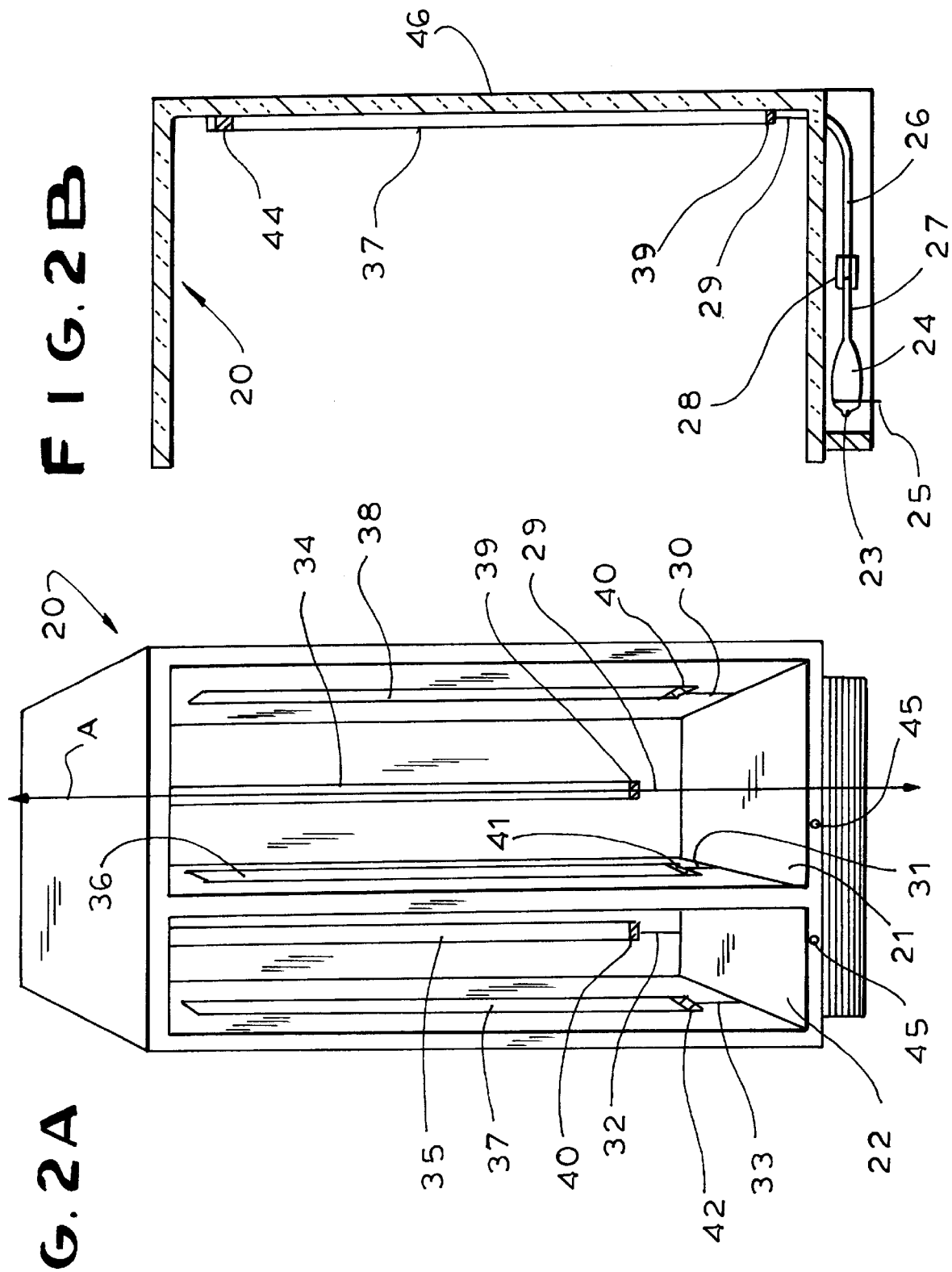

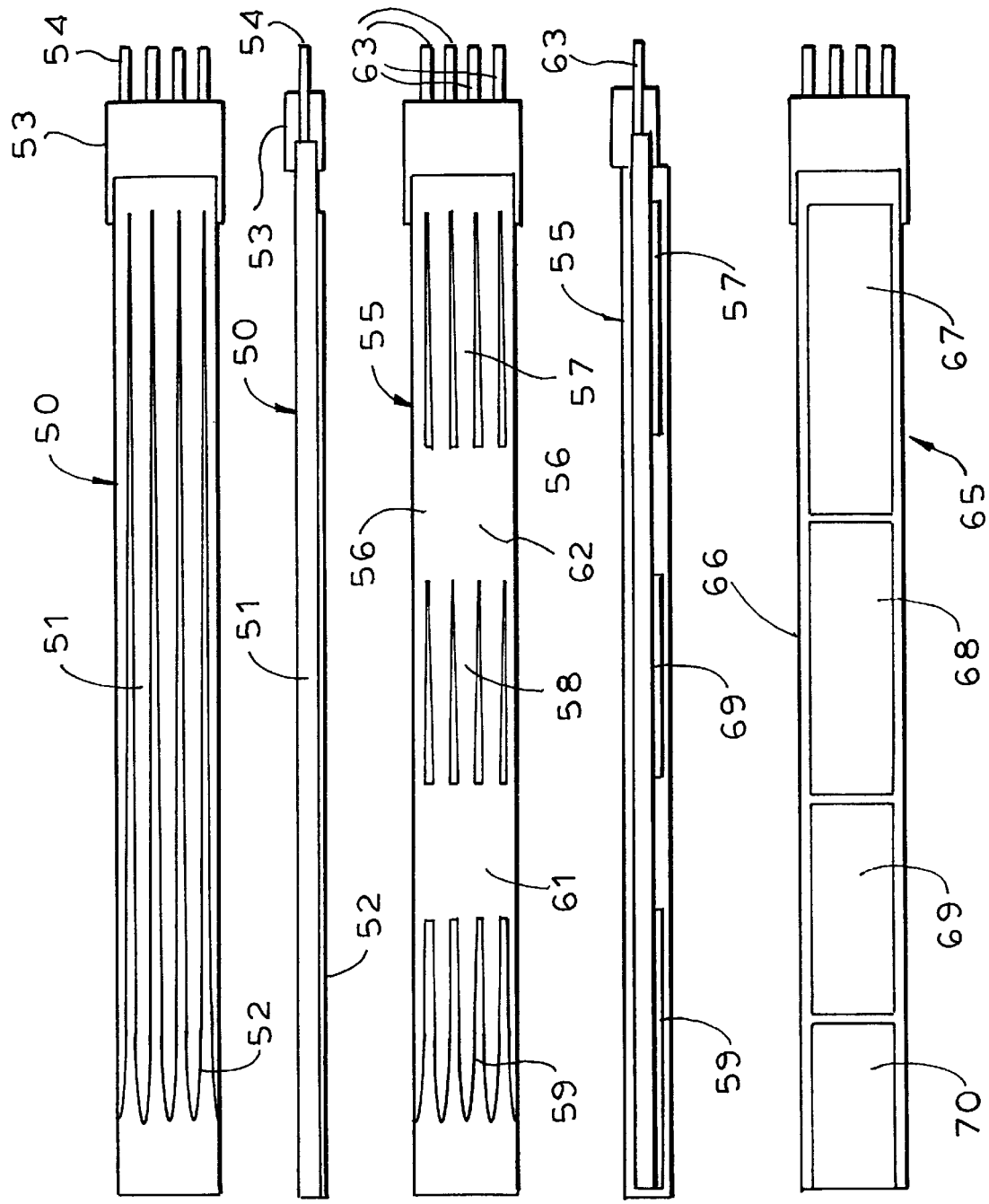

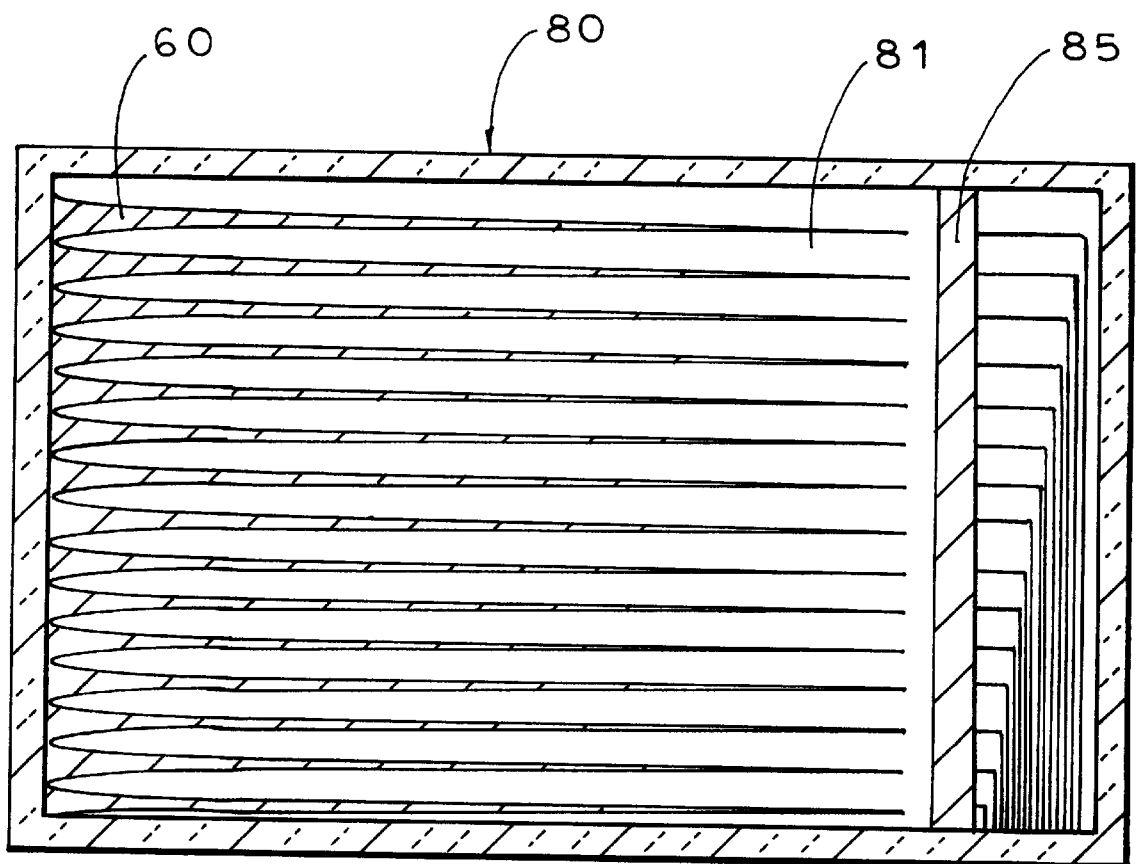
FIG. 4A
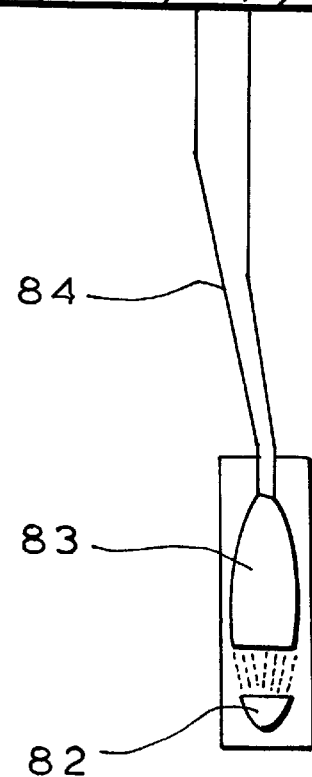

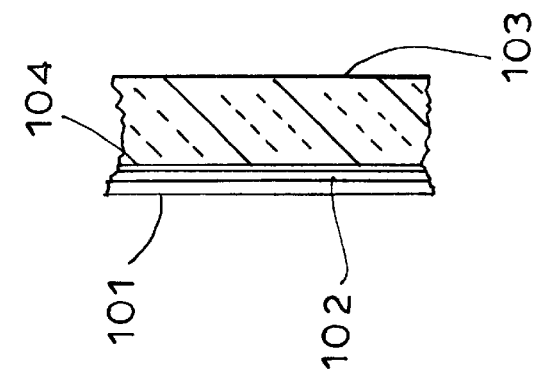
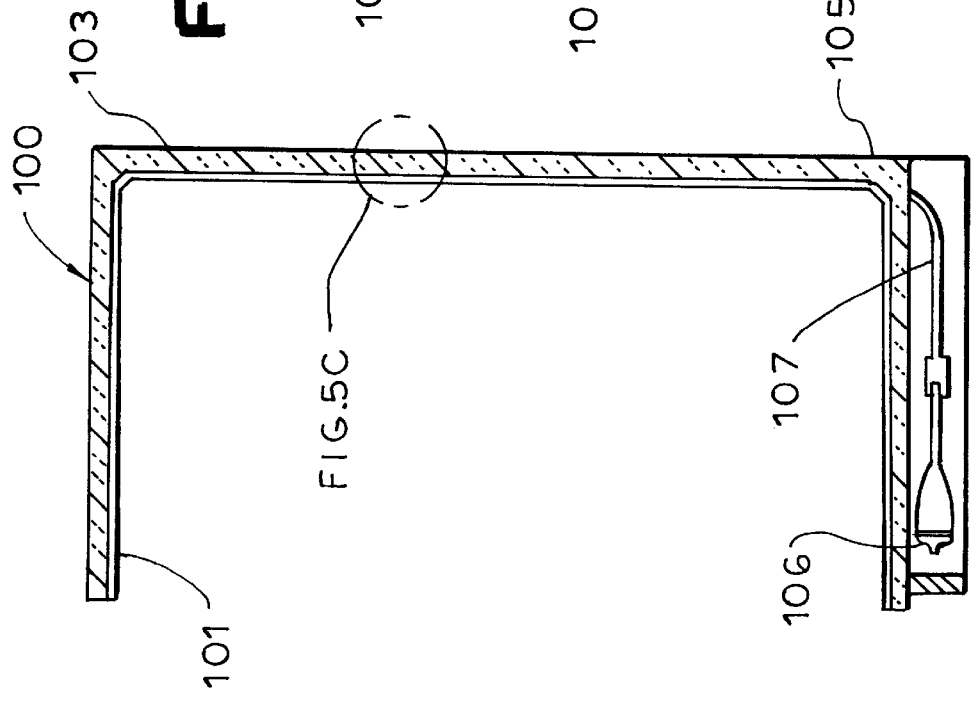
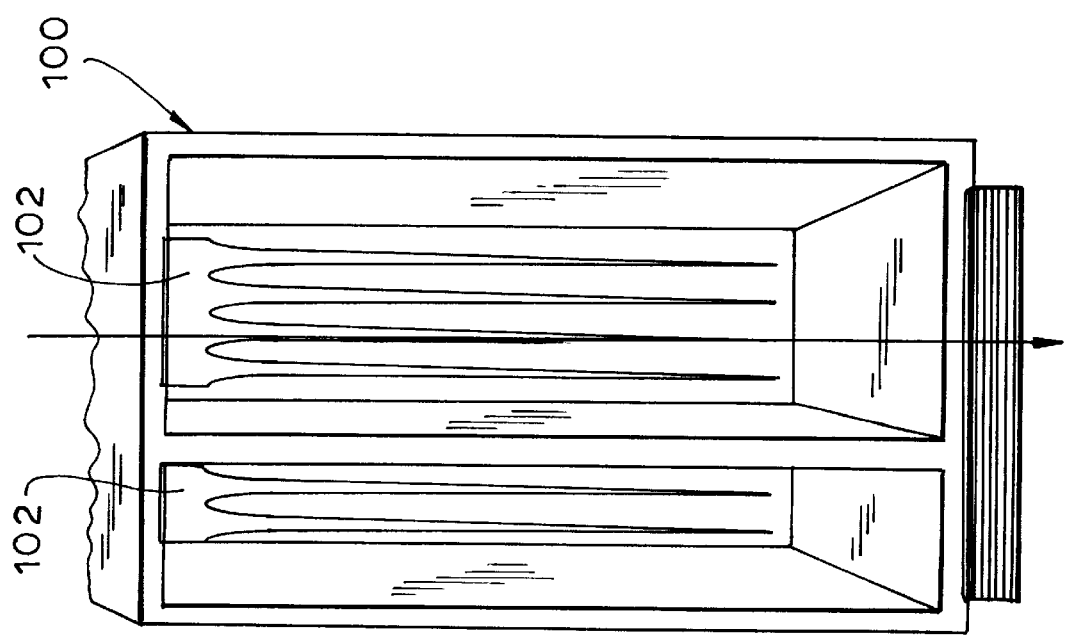

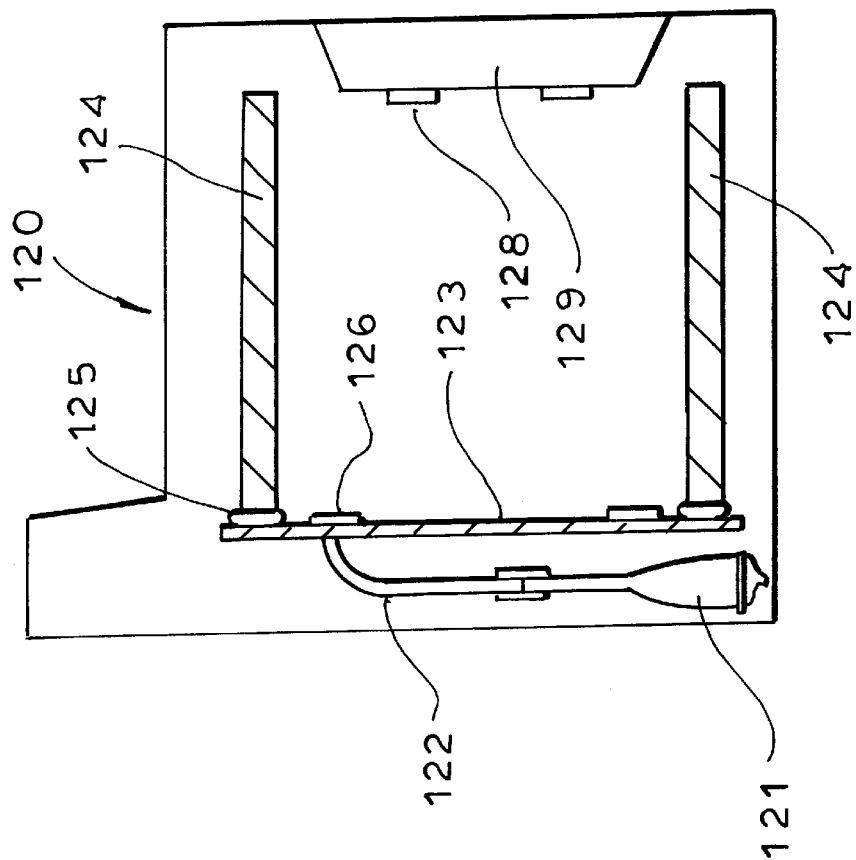
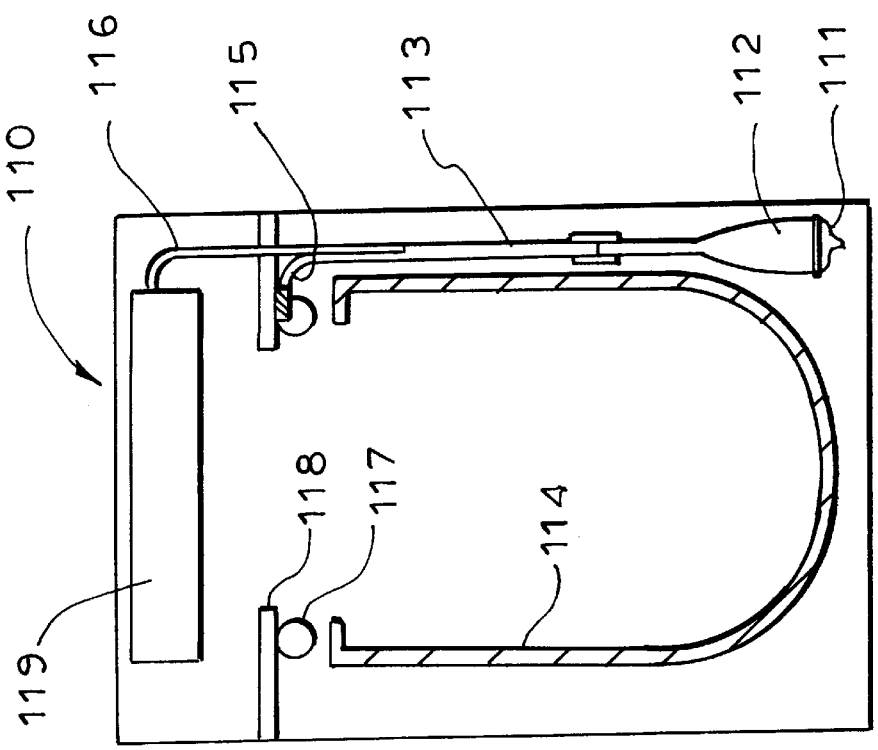

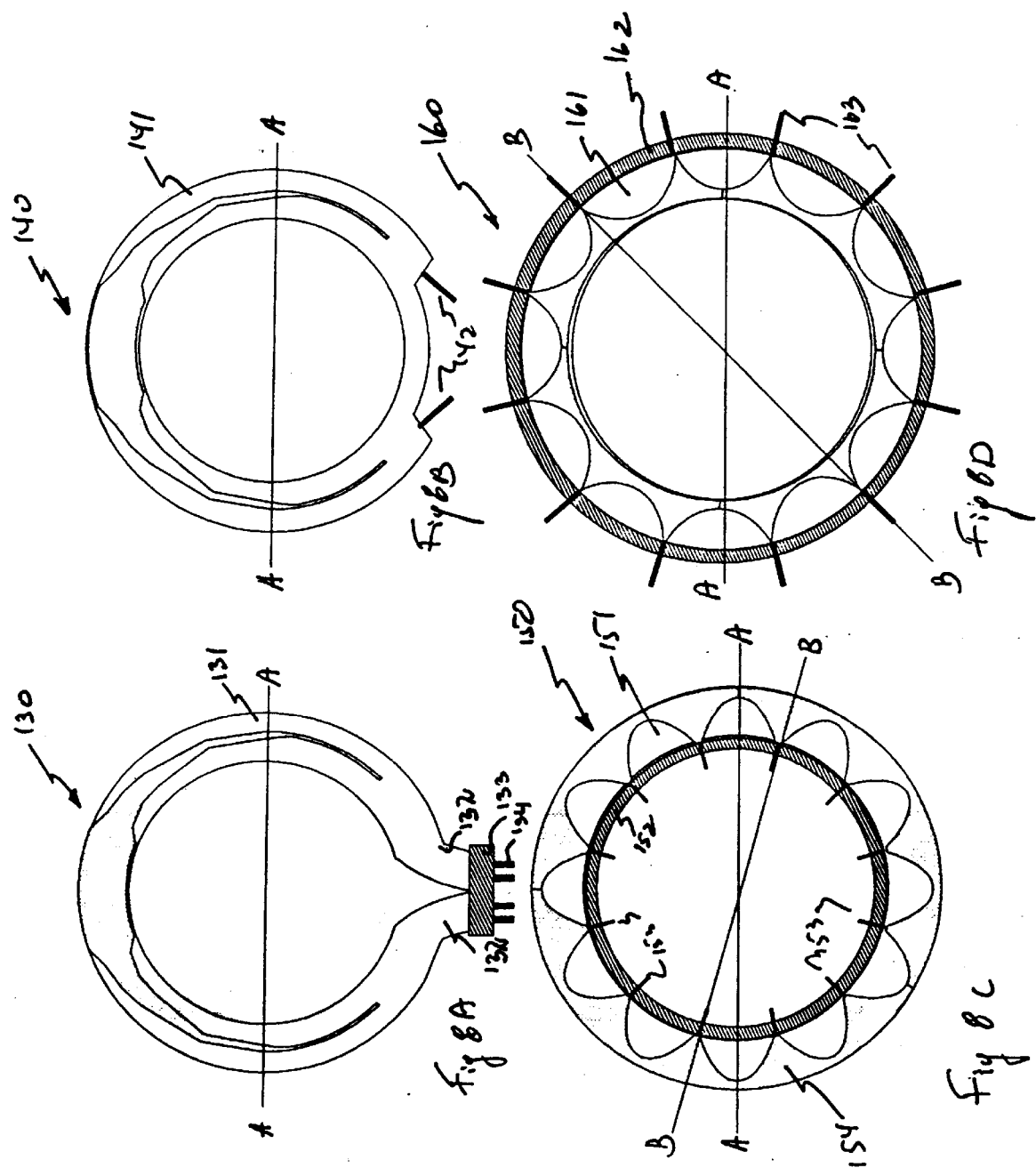

FIG. 9A
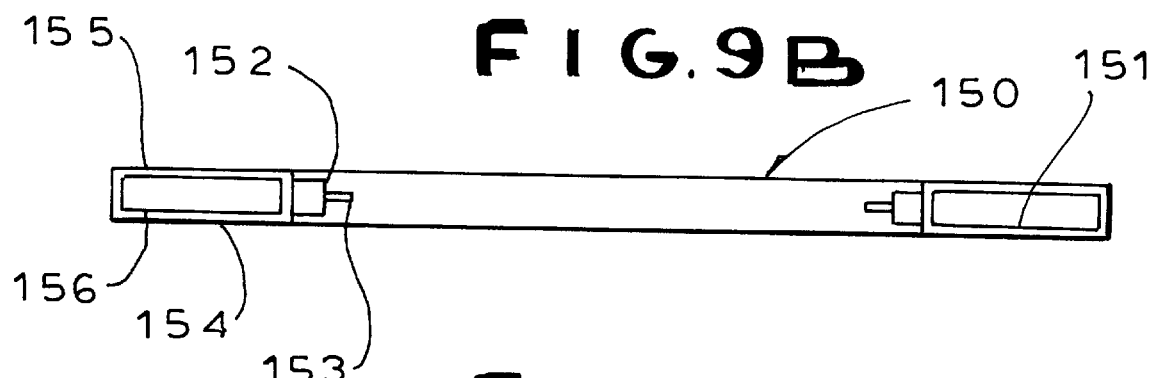
FIG. 9B
FIG. 9C
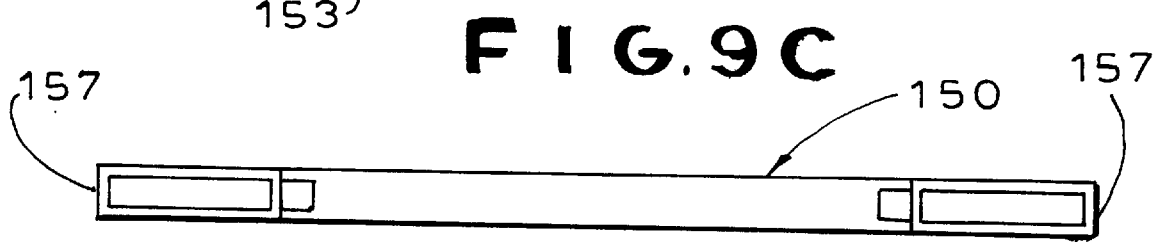
FIG. 9D
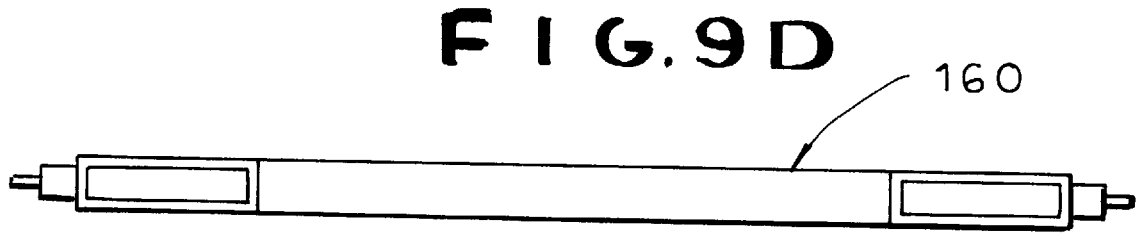
FIG. 9E
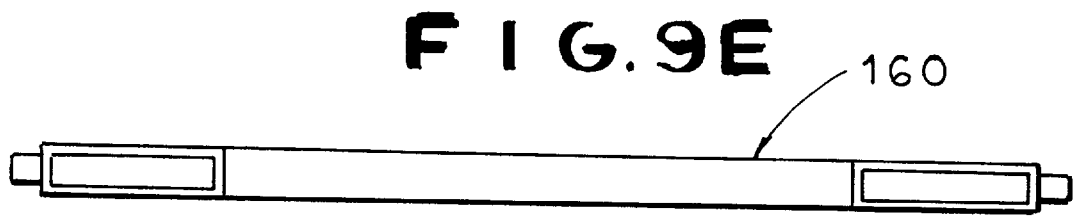

REMOTE ILLUMINATION AND LIGHT APPORTIONMENT IN APPLIANCES

FIELD OF THE INVENTION

My present invention relates to the interior illumination of appliances and, more particularly, to an improved technology for internally illuminating an appliance and to the system for effecting such illumination. For the purposes of this application, an appliance can be any of the many devices used in a household, commercial or office environment and which usually is connected to an electric source, e.g. by a line cord, has a housing which completely or partially encloses an interior space requiring illumination, and has one or more electrically operated devices affecting the space. Such devices can include heating, cooling, air-circulating, humidifying, drying, agitating, moving, mixing, separating, squeezing or pressing means. Appliances within the purview of this application can include, without limitation, refrigerators, freezers, clothes washing machines, dish washing machines, stoves, range hoods, clothes dryers, microwave, convection and radiant-heating ovens.

BACKGROUND OF THE INVENTION

When considering the illumination of the inner space of various appliances, designers are confronted by various obstacles. In microwave ovens, for instance, the light source must be placed behind a Faraday screen to assure that the conducting elements of the light source and its socket do not act as susceptors to the microwave and thus overheat. Even worse, these metallic elements can distort the electrical field of the microwave and cause sparking. The Faraday screen blocks a large proportion of the light emitted by the light bulb thus resulting in a very inefficient means of illuminating the microwave cavity.

In gas and electric ranges, the high temperature in the range prevents the positioning of good light sources within the range, and to the extent that a light source is used, it must be thermally isolated from the heated space resulting in very poor illumination and a costly installation.

In most clothes washers and dishwashers no internal illumination is present, because of the incompatibility of electrical contacts and lighting sources with water. In some rare models, one can find a single light bulb positioned behind a protective lens which provides the necessary hermetic seal between the wet environment inside the appliance and the bulb and its contacts. However, such an arrangement is costly and provides poor illumination in the appliance. Similarly, only a single point illumination is provided in clothes dryers in general for similar reasons.

In refrigerators and freezers a plurality of strategically placed bulbs provide internal space illumination but the heat generated by these light sources must be removed (at a high thermal performance penalty). Furthermore the quality of illumination is poor, since point sources are used which create zones of extremely high illumination, usually where such high light fluxes are not required, and such point sources project shadows within the appliance leaving many zones poorly illuminated.

In larger appliances, such as refrigerators, in order to provide good internal illumination, a plurality of light bulbs are employed, as a result unnecessary costs in complex electrical harnesses are incurred. In commercial refrigeration units such as used for point of sale of refrigerated goods or to display dairy, meat and other products, the problems imposed by current state of the art illumination systems which consist almost exclusively of fluorescent lighting, are numerous. In these appliances, the lights are usually on all the time so that the heat generated by these light sources (equal to a least 80% their power rating since the only power escaping is light that exits the enclosure) needs to be withdrawn by the refrigeration unit, at appreciable operational cost. The proximity of glass and electrical contacts to a high traffic environment poses special design challenges that increase the installation cost. For instance, each fluorescent bulb is enclosed within a cylindrical polycarbonate structure to prevent accidental breakage. This reduces the light available by at least 8%. The sockets or bulb seats must be sealed to prevent water leakage during cleaning, thus increasing the basic cost and complicating the bulb replacement task. Fluorescent light sources are characterized by the fact that the light is emitted circumferentially in a linear angle of 360°, but in most applications, light needs to be delivered to an aperture of only 180° or 90°, thus between 50% to 75% of the generated light is wasted. Finally, for low temperature commercial freezers, the operation of the light bulb is impaired due to the low temperatures. Thus additional insulation around the light bulb is required, or heating the lamp enclosure is practiced, or specialized ballasts are employed. All these approaches to solve the low temperature operational environment of the fluorescent light bulbs have a major negative impact on operational, maintenance and installation costs of such lighting systems.

Domestic and commercial appliances are typically used in conjunction with food or clothing, the use of breakable glass light bulbs in such an environment poses unnecessary danger of food and clothes contamination with glass fragments and hazard to operating personnel.

A small step toward the rationalization of light resources utilization in appliances is disclosed in U.S. Pat. No. 4,706,169 granted to Bussan et al, where a light guide is used to tap a small portion of the light from a light bulb within the appliance (used to illuminate the inner space of the appliance) and the light is transferred to the opposite side of the light guide to illuminate a dial outside the appliance's inner space. While this reduces the need for a special bulb for the instrument dial, there are great limitations on the light distribution feasible from the light guide, since this distribution is limited by the light guide's output aperture.

Accordingly, there is a need for more effective means of providing illumination inside various appliances, and particularly, means that provide such lighting in a more homogeneous manner and without the shortcomings of the prior art. Specifically, for cooled appliances such as refrigerators and freezers, means that do not discharge heat in the refrigerated space and where the need for complex wire harnesses is eliminated, in water-operated appliances such as dishwashers, clothes washers and dryers, means that are compatible with the presence of large quantities of water and need not be isolated from such water and in hot appliances such as ovens, ranges and microwave ovens, means that can withstand the temperature and the microwave environment without undue deterioration.

OBJECTS OF THE INVENTION

It is the principal object of the present invention to provide an improved illumination system for appliances in which the aforedescribed drawbacks are obviated.

Another object of the invention is to provide improved appliances which are more user friendly than earlier systems, especially with respect to the ability to view interior spaces of such appliances.

SUMMARY OF THE INVENTION

In its most general sense, the invention provides, in attaining the aforedescribed objects, for an appliance having a housing at least partly enclosing an interior space, an electrical device affecting that space and connectable to a source of electricity, and an illumination system for illuminating the interior space and including means for generating light at a location (usually in the housing) outside the interior space, light guides extending from that location into the interior space, and light-extraction means optically coupled to the light guides extending at least along a length of each light guide and an extended area along at least one wall of the space.

According to the invention, therefore, light is generated at a point outside the appliance's usable space, the light is then transmitted to that space with optical fibers or other optical wave guides and judiciously redistributed in the space with light extraction elements from which light is distributed in a controlled manner. Placing the light source outside the usable space reduces the complexity of the wire harness required, allows for easy control of the spectral distribution of the light in the usable space and provides a great degree of flexibility in distributing the available light resources where illumination is required. In some embodiments, particularly when the appliance is a refrigerated appliance such as, but not limited to refrigerators and freezers, the infrared part of the spectrum generated by the light source is blocked and thus the thermal load on the system drastically reduced. In other embodiments of the instant invention, particularly for commercial refrigeration space, means are provided to control during different periods of the day the spectral distribution of the light, so as to provide the bactericidal effect of ultraviolet light to reduce bacterial growth, for instance during the night, or in specially designed enclosures, continuous exposure to UV.

A method of apportioning light to different parts of an appliance at will is provided by the partition of the total light resources available into a plurality of discrete light transmission elements and reassembling from the discrete elements light transmission means, each dedicated to its specific segment of the appliance, and each transmitting its apportioned part of the total light resources, which is proportional to the number of discrete elements it contains.

A typical embodiment of the instant invention thus includes the following elements, a collimatable high intensity light source (for instance an MR-11 or MR-16 halogen bulb), light concentration optics to couple the light source to light transmission means, and light transmission and distribution means, for instance a bundle of optical fibers or some other light delivery elements, and light extraction elements, for instance large diameter fibers or optical wave guides that have been treated to emit light in a direction generally perpendicular to the light's propagation direction.

The first three elements are common to most of the embodiments of the present invention and the nature of the light extraction elements depend on design and functionality considerations for each specific embodiment. In most embodiments, the light source is positioned near the electronic controls or the electrical driving machinery of the system, an area intrinsically sheltered from the unique environment that need be illuminated.

The light transmission bundle consists of either plastic or glass-based optical fibers which are intrinsically immune to the unique environment illuminated. In some embodiments of the invention, however, special light pipes made of optically transparent materials such as, but not limited to polymethylmethacrylate (PMMA) are used to distribute the light from the light source to a plurality of light extractors so as to optimize the light distribution within a specific appliance.

A preferred embodiment utilizes as light extractors elements as described in U.S. Pat. No. 5,222,795 whereby an optical fiber or a planar optical wave guide is treated along a light extraction zone to control the rate of emission of light from the light extractors. As will be described in more detail, a variety of treatments can be used to achieve the desired extraction rate of light. In some embodiments the treatment consists of silk screening one or more lambertially reflecting paint or ink patterns having generally triangular shape, with the narrow part or parts of the pattern at the proximal end of the wave guide, or the point of light injection into the light extractor, and the broad side at the opposing distal end of the light extractor. The details of the shape of the pattern has been described in detail in U.S. Pat. No. 5,222,795.

In some embodiments, when it is desired to use a single light extractor to distribute light over few discrete regions, the light extracting patterns are simply interrupted at those zones where no light emission is desired and then continued where light extraction is required.

In other embodiments, particularly refrigerated spaces, glass or other optically transparent material is used as shelves and as optical wave guides that emit light within the appliance. In such embodiments I use lambertially-reflecting paint when I desire to extract light mostly from one plane of the shelf and etch the pattern when it is desired to extract light from both opposing planes of the shelf.

Surprisingly, I have found that the efficiency of utilization of light resources is improved relative to the existing state of the art, despite the fact that light collection, concentration and transmission losses of between 30% to 50% are incurred. The reason for such improvement is that in the current state of the art, a very large portion of the light generated by the light source either does not reach the space to be illuminated (for instance in microwave ovens, where the source is behind a Faraday screen, or in other appliances, when a light bulb is sheltered behind a sealed lens), or in other appliances using an exposed light bulb, where a very large proportion of the light illuminates the appliance walls rather than the appliance's inner usable space.

Thus the appliance of the invention can comprise:
an appliance housing defining an interior chamber at least partially closed by the housing;
an electric power connection to the appliance for energizing same, the appliance having at least one control mounted on the housing for regulating a condition within the chamber, the chamber having walls;
at least one lamp in the housing outside the chamber and supplied by the electric power connection;
light-transmission means illuminated by the lamp and extending to at least one of the walls for delivering light to the chamber from the lamp; and
light-extraction means and extending along at least one light wave guide optically coupled to the light-transmission means and located in the chamber for emitting light transmitted to the light-extraction means in a direction generally transverse to a light-propagation direction therealong to illuminate the interior chamber.

The light extraction means can include a pattern of surface formations in the form of:
a pattern of roughening on an outer surface of the light wave guide;

a pattern formed by a lambertial reflector;

a pattern formed by a cladding for an outer surface of the light wave guide;

a pattern formed by a reflector on a cladding for an outer surface of the light wave guide;

a pattern of embossment of an outer surface of the light wave guide;

a pattern of embossment of an outer surface of the light wave guide covered with a cladding; and a pattern of embossment of an outer surface of the light wave guide covered with a cladding and then a reflector.

In one particular embodiment the appliance is in the form of a cold-storage appliance having a refrigerating unit for cooling the chamber, and at least one fan, the lamp being provided in a region of the fan so as to be cooled thereby.

In another embodiment the appliance can include rotating means in the chamber to treat articles disposed therein with a fluid, the one of the walls being fixed and having an aperture through which the light-transmission means passes, the appliance further comprising sealing means around the light-transmission means providing a waterproof seal therefor, the light-extraction means including a circular member mounted on the one of the walls.

In a method aspect of the invention, a method of apportioning light resources in an appliance can comprise:

(a) coupling at least one light source located outside the chamber with a light-transmission means and piping light by the light-transmission means to the chamber;

(b) subdividing light piped to the chamber along respective paths through the light-transmission means to illuminate respective areas of the chamber with respective light fluxes and proportioning light-transmission cross section of the light-transmission means for the respective paths in accordance with the fluxes; and (c) distributing light in the regions by coupling ends of the paths of the light-transmission means to respective light extractors at the regions and emitting light along lengths of the light extractors at the regions.

The invention also comprises a method of inhibiting micro-organism grown in an enclosed space which can include the steps of:

(a) producing ultraviolet light at an ultraviolet light source at a location outside the space;

(b) supplying the ultraviolet light to the space by coupling a light-transmission means with the source outside the space and piping the ultraviolet light to the space with the light-transmission means; and (c) emitting ultraviolet light in the space from a light extractor optically coupled to the light-transmission means.

BRIEF DESCRIPTION OF THE DRAWING

The above and other objects, features, and advantages will become more readily apparent from the following description, reference being made to the accompanying drawing in which:

FIGS. 2A and 2B are schematic illustrations of a refrigerator remotely illuminated and shown in section or broken away;

FIGS. 3A and 3E are elevational views which show different embodiments of linear light extractors used in various appliances of the invention;

FIGS. 4A to 4F are schematic drawings of various light shelves used in the instant invention, FIG. 4A being an elevational view, FIG. 4B being a plan view and FIGS. 4C–4E being detail views;

FIGS. 5A, 5B and 5C are respectively a perspective view, a section and a detail view which describe a refrigerator in which the internal shell is converted to a light extractor;

FIGS. 6 and 7 are schematic sections of remotely illuminated clothes washing and drying appliances respectively;

FIGS. 8A to 8D are top views of various circular and toroidal light extractors;

FIGS. 9A to 9G are cross sectional views of the circular and toroidal light extractors;

SPECIFIC DESCRIPTION

Figure 1:
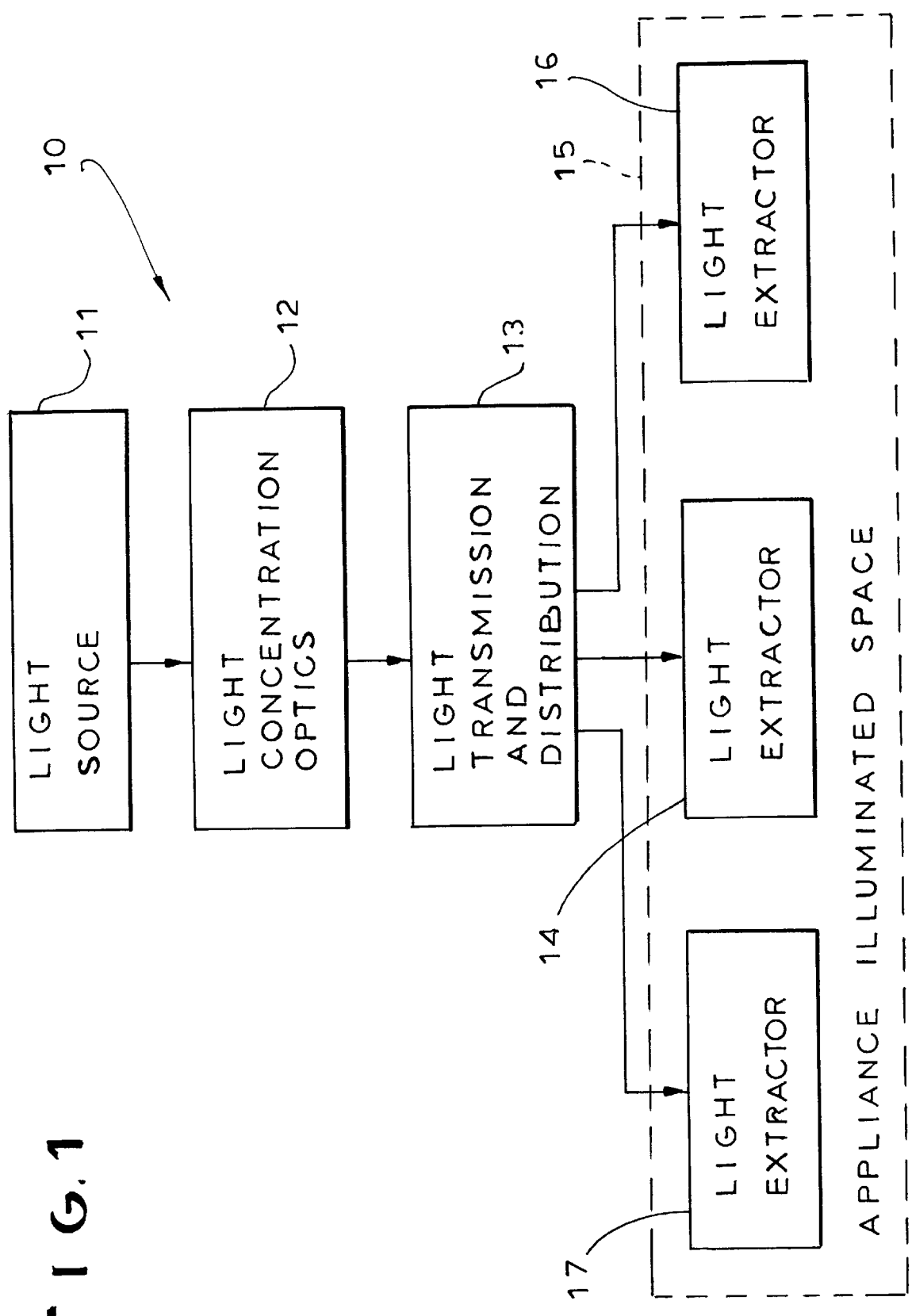
FIG. 1 is a block diagram of a generalized remote illumination and light apportioning system of the instant invention.

FIG. 1 is a general diagram of a remote illumination system 10 of the present invention. The system includes at least one light source 11, whose output can be concentrated or otherwise coupled with light concentration optics 12 directed into the proximal end of a light-transmission and distribution element 13. The distal end of the light-distribution system can be terminated either as a single termination optically coupled to a light extractor 14 within the appliance illuminated space 15, or as plurality of terminations each coupled to its own light extractor, for instance light extractors 14, 16 and 17. Typically, the appliance is a refrigerator, a freezer, a sales display refrigeration or freezer system, a washing machine, a dryer, a range or range hood or any other appliance where light is delivered to a use space without having the electrical connections and glass bulbs associated with converting electricity to light within the space.

A typical light source can be a halogen bulb having a dichroic reflector, such as, but not limited to, a halogen lamp of the MR-16 or MR-11 class. For a large appliance such as a refrigerator, one would thus replace four to five bulbs having a power rating of 40 watts each with a single bulb having a rating of 150 watts, at an appreciable reduction of costs. For smaller appliances, lower power light sources can be used. In some specialized applications, for instance, when ultraviolet illumination is desired in order to reduce bacterial count in refrigerated food or storage facilities, one can use special UV emitting light sources, and as will be shown below, one can use the same light-transmission and distribution system for more than one type of illumination.

Light concentration devices that can be used in conjunction with the instant invention include elliptic mirrors, as are standard in some halogen and other lamps. To improve the collection efficiency of the light from the light source, a compound parabolic concentrator or other nonimaging optics can be used. In such cases it is sometimes beneficial to use a parabolic reflector for the lamp, where the point light source is the focal point of the paraboloid of revolution forming the reflector. Other collection optics such as lenses and tapered optical funnels can be used as well, but their efficiency of light collection is somewhat lower.

Light transmission and distribution is provided with a bundle of optical fibers that is coupled to the light source, usually via the light concentrator. The bundle is then split to sub-bundles, each coupled to its own light-extraction element. An advantage of using a compound parabolic concentrator as an optical coupling device between the light source and the light-transmission and distribution bundle, is that the compound parabolic concentrator acts, to some extent, as a light homogenization device. Thus the light flux in each fiber in the bundle is relatively constant and independent of the fibers' specific position in the bundle.

One of the advantages of the invention is that it provides a method of distributing light from a single source to different locations and apportioning the light flux provided at each location. Thus if an appliance has a number of compartments, each of a different size, and it is desired to illuminate all compartments at the same light intensity, larger compartments will require a higher light input than smaller compartments. To achieve the desired homogeneous level of illumination, I can simply split the master bundle of fibers into sub bundles, those sub bundles that are coupled to a light extractor illuminating larger spaces having a proportionately larger number of fibers than those illuminating smaller spaces.

In some embodiments of the invention the concentration optics is terminated with a cylindrical dielectric having the same cross section as the light-transmission bundle to improve the homogeneity of light distribution between the discreet fibers, so as to obtain better apportionment of the light resources within the appliance, and improve optical coupling between the concentration optics and the transmission bundle. In other embodiments, the concentration optics and transmission optics are integrated within a single molded light manifold element.

In a preferred embodiment of the invention the light extraction elements are made according to the teaching of U.S. Pat. No. 5,222,795. In this patent there is described a variety of methods and systems which allow controlled light extraction from optical fibers and wave guides in a direction generally perpendicular to the direction of light propagation within the fiber or wave guide. In other embodiments, other light-extraction means characterized by the fact that they emit light along a given length or along a light extraction zone are employed.

Typically, the light-extraction element can be from few inches to few feet long. Some light-extraction elements are large diameter optical fibers, or cylindrical wave guides. When such light extractors are used, light is extracted from the side of the fiber into an angle that can be controlled. In most applications this angle will be about 60° to 90°. However, as taught in the aforementioned patent specification, light extractors that emit light from the total circumference of the cylindrical wave guide can be designed as well. When an optical planar wave guide is used to extract the light in a controlled manner, (namely a flat plate of a transparent dielectric material) the light is emitted essentially lambertially into either a single direction relative to the wave guide flat surface, or from both surfaces of the wave guide, as is explained in more detail below. Circular light extractors, disc-shaped light extractors as well as toroidal light extractors can be used as well.

In FIGS. 2A and 2B, I show a typical embodiment of the invention for a domestic refrigerator 20, having a relatively large refrigerator compartment 21, and a smaller freezer compartment 22. FIG. 2B represents a cross section through the plane A—A of FIG. 2A. A light source 23 is positioned in the space between the bottom of the refrigerator and the floor, outside the shell 46, of the refrigerator. The light source can be, for instance, a halogen light source having an elliptic dichroic reflector that allows lights having a wavelength longer than about 750 nanometer to pass through the dichroic reflector, while light of a shorter wavelength is reflected toward the light concentrator 24. In this device, the point source (the luminous element in the lamp) is positioned at one focal point of the elliptic reflector while the second focal point is within the concentrator's optics. To control the spectral distribution of the light entering the concentrator 24, one can use an additional filter 25 interposed between the light source 23 and the concentrator 24.

In FIG. 2B I show a compound parabolic concentrator as the coupling element between the light source and the light-distribution system 26. In this specific embodiment, the compound parabolic concentrator is made out of a solid dielectric material (for instance, it can be molded from polymethylmethacrylate (PMMA)), terminated on its distal end with a simple tubular element 27, having a cross section equal to that of the light-distribution system 26, initial diameter. This configuration allows for further homogenization of the light distribution along the cross section of the distribution element, since the tubular element 27, acts as a kaleidoscope by total internal reflection of the light traveling through it. It should be understood, however, that when space limitation exists, the tubular structure can be made essentially nil and the transmission line can be interfaced directly at the distal end of the compound parabolic concentrator.

The connection of the concentrator 24 to the light distribution system 26 can be achieved in a number of way. When a permanent connection is desired the two ends can be cemented with an index matching optical epoxy. When one desires to have a nonpermanent connection, a ferrule 28 can be used, which is in essence a hollow tubular structure in which the proximal end of the light-distribution system 26, and the distal end of the other. In order to improve the coupling and reduce end reflection losses, one can use an optical grease with the appropriate index of refraction as a coupling medium between the two elements. It should be mentioned here, that the spectral control element 23 can be positioned within the ferrules, thus reducing the size and the cost of such an element. When this approach is taken, it may be desired to have a free space between the spectrum modifier and the ends of the coupling and distribution optics, when such an embodiment is contemplated, it is best to use a ferrule that has its hollow coated to be reflective so as to minimize losses.

The light-distribution system 26 is split into a plurality of sub-bundles 29, 30, 31, 32 and 33, with the number of fibers in each sub bundle selected to provide the desired apportionment of light resources available between the illuminated zones. Thus, if for instance the master distribution fiber bundle contains 100 fibers, and I want to distribute 40% of the light into the freezer compartment 22, and 60% of the light into the refrigerator segment 23, I would split the bundle in such a way that 40 fibers would power the light extractors in the freezer (for instance light extractors 34 and 35) and 60 fibers would power the light extractors in the refrigerator segment 21, namely extractors 36, 37 and 38. Thus sub-bundles such as those denoted 29 and 32 do not have to contain the same number of fibers, and actually, the fact that we have divided the totality of the light delivered to the distribution system into a large number of equally illuminated fibers, allows me to divide the light according to the designer's wish, in essence at will. This method of providing apportionment of the light resources in an appliance in any proportion desired is completely novel to the art of lighting appliance and enabled by the instant invention.

After selecting the flux of light desired in each part of the refrigerator and accordingly selecting the number of fibers in each sub-bundle, the distal ends of the sub-bundles can be terminated in the form of connectors, similar to the one described before the connection of the transmission bundle to the concentrator. The only difference being the form factor which is adjusted to have a cross section mating with the light extractor's cross section. Thus if cylindrical light extractors are used, the form factor is cylindrical, and if planar wave guides are used as light extractors, the cross section is rectangular. It is of course preferable, in order to limit reflection losses at the end of the fibers to polish such terminations. When using plastic fibers, in which the core is made from PMMA, thermal polishing is-often quite sufficient to achieve the desired results.

Each of the sub-bundle terminal connectors (such as connector 39) is fastened to its appropriate light extractor which are fastened to the inner walls of the refrigerator (for instance with a fastening device 44 and using the connector 39 itself as a fastening device.

The light extractors (34, 35, 36, 37 and 38 in FIGS. 2A and 2B) can be any optical device in which light is injected at the proximal end to propagate within the device along its length, following the well-known principles of total internal reflection, and is extracted along the length in a controlled manner. In traditional optical wave guides and fibers, light propagates along the length of the device with minimal extraction of light from the sides of the wave guide (or fiber) as long as the angle of propagation within the wave guide is smaller than the critical angle, which is determined by the relative indices of refraction of the wave guide's core and its cladding. The cladding can be air or a material with a lower index of refraction than the core. In the present invention, the core is treated in such a way that light is extracted from the wave guide and thus light emanates along its length.

In a preferred embodiment of the invention, the light extraction elements are constructed according to the principles taught in U.S. Pat. No. 5,222,795, granted to the inventor of the present invention. In other embodiments another light extraction system may be utilized as will be further described below.

FIG. 3A is a top view through a light extractor 50 based on the aforementioned patent and FIG. 3B is a cross section through the same light extractor. The light extractor 50 is a planar piece of optically transparent material forming a wave guide 51, on which is formed an extraction zone 52. This extraction zone has a geometry designed to control the rate of light extraction along the light propagation direction. The extraction zone can be painted or silk screened and simply be a lambertial reflector. A white paint or silk screenable ink, having an index of refraction equal or larger than the index of refraction of the wave guide 51 assures that light impinging on the extraction zone is reflected in all angles, and as result, a large proportion (reflected at angles larger than the critical angle within the wave guide) emanates from the wave guide without further internal reflection. The shape of the extraction zone is calculated according to the desired extraction rate J(z), where z is measured from the light-injection point (the proximal end) and increases toward the opposite end of the light extraction element, the distal end. In the aforementioned patent, methods to calculate the shape of the extraction zone were detailed. The connector 53 can be made from either an opaque or transparent material.

When very high homogeneity of light distribution is desired, an opaque material is selected, since it is difficult to completely eliminate back reflections and injection of light outside the angle of acceptance of the wave guide. These connection optical losses show as a zone of stronger illumination at the connector when transparent connectors are used. When a high degree of homogeneity is less important than total light output, transparent connectors are preferably used. Note that the light extractor described in FIG. 3A has no cladding on its surface, thus in essence the air surrounding the wave guide (and having a very low index of refraction of 1) serves as cladding.

In some embodiments of the instant invention it is preferred to use light extractors 55, as illustrated in FIG. 3C (and its cross section, FIG. 3D). The light extractor 55 consists of an optical wave guide 56, made as above from an optically transparent material, on which a plurality of extraction zones 57, 58 and 59 are applied, having between them zones 61 and 62 free of extraction zones. The shape of the extraction zones, namely their width relative to the core's cross section as a function of the distance z from the proximal end, is calculated to provide the desired light extraction rate at each point z according to the teaching in the aforementioned patent. In this embodiment, the light is extracted mostly in the zones 57, 58 and 59, with very little light emanating from the wave guide surface in the extraction zone-free areas 62 and 61. By using the correct design of the extraction zones 57, 58 and 59, I can apportion the light budget available from the sub-bundle 63 to the illuminated zones in essentially any proportion desired. Such a fractionated extraction zone is particularly useful in an appliance's space that is divided by shelves into a number of independent sub spaces, and it is desired to optimize the distribution of the light between the shelves rather than on the shelf's bottom or top. Thus the position of the shelves is usually selected to be essentially in the centers of the extraction zone-free areas 61 and 62.

FIG. 3D also shows a very thin cladding 60, applied to the whole surface of the wave guide. This cladding, whose thickness has been exaggerated in FIG. 3D, can be any transparent or translucent material having an index of refraction which is smaller than the wave guide's core 56 index of refraction. Appropriate materials for this purpose can be, but are not limited to, Optiguard Q3-6663 from Dow Corning, or Viton (a fluoropolymer from DuPont), or any of a number of fluoroplastic terpolymer, for instance THV-200P from the 3M Corporation. The cladding is applied after the extraction zones have been applied directly onto the core 56, to assure that light propagating within the wave guide 56 interacts with the extraction zones to cause the controlled extraction of the light from the wave guide.

When a cladding 60 is applied (and it should be clear that such a cladding can be applied to light extractors described in FIG. 3A as well), one can then apply on the outer surface of the bottom cladding (the side of the wave guide where the light extraction zones are applied), a white reflective paint, or tape, or a specular reflective film. This additional reflecting is surface is used to reflect back toward the active surface, or the front surface, that portion of the extracted light which is reflected back from the front surface. This reflective film increases the efficiency of the light extractor by about 4 to 5%, by reflecting the light extracted in the back direction of the light extraction. In this manner I can obtain a light extractor from which all light emanates essentially from the front surface of the light extractor.

FIGS. 3A and 3C show the distal part of the plurality of the light extraction zones coalescing into a single lambertian reflector. In the coalesced zone of the light extractor, the light extraction rate is not controlled as in the variable width extraction zone. Nevertheless, in some embodiments it is preferred to include such a coalesced zone to extract this part of the light propagated within the wave guide which has not interacted with the extraction zone. Light traveling through the wave guide at a very shallow angle to the wave guide's axis will be reflected only a few times from the wave guide's internal surfaces, and some light propagating at very low angles never interacts with the wave guides' flat surface, and is emitted at the distal end of the wave guide. One can control the proportion of the total light flux which is not extracted by increasing the aspect ratio of the wave guide, namely its length divided by its thickness. The larger this aspect ratio, the smaller is the proportion of light which is not extracted from the wave guide's surface. The designer of the lighting system of an appliance according to the instant invention, can elect to optimize the light distribution's homogeneity or to optimize the total light output and sacrifice some of the homogeneity. In the former case, the light extraction zones at the distal end would abut each other and overlap over a very small length of the end of the wave guide, and the residual light that has not interacted with the light extraction zone would be absorbed at the distal end by applying a black light-absorbing element to the end. In the latter case, the designer can select to let the residual light escape from the end face of the light guide, or apply a reflective element (preferably lambertian) to the end face so as to reflect back the residual light lambertially into the illuminated space, this is also the case when a relatively large area of the extraction zone coalescence is used.

In some embodiments of the instant invention, the designer of the lighting system may elect to use the unusual shape of the light extractors, as an aesthetic accent to the appliance. In other embodiments it may be preferred to have the light extractors appear as homogeneous flat light sources. In the latter case, one can use on the front surface of each light extractor a diffusing cladding such as viton, or, alternatively, on top of a transparent cladding, adhere a refractive thin diffuser. Another option is shown in FIG. 3E, where the light extraction element 65 is made of an optically transparent wave guide 66, on which the back cladding consists of a series of thin sheets 67, 68, 69 and 70 and containing fine scattering particles (such as but not limited to silica gel, alumina or titania). These sheets have a progressively increasing index of refraction in the direction of light propagation. Thus, if the wave guide is made of PMMA, having an index of refraction of about 1.5, the first cladding element of thin sheet 67 may be made of pure THV having an index of refraction of 1.35 and additional elements having indices of refraction progressively higher, until at the distal end, to assure full extraction of all residual light, a sheet made of a material having a higher index of refraction than the core (for instance polycarbonate having an index of refraction of 1.6) is used as the last element of the cladding. It should be clear that a cladding having a continuously variable index of refraction, as described in the aforementioned patent could be used in lieu of discrete cladding elements as well.

Returning back to FIGS. 2A and 2B in operation, the opening of a door in the refrigerator releases a switch 45 which turns on the light source 23 whose light is concentrated by an optical concentrator 24 after being spectrally conditioned through a filter 25. Light is coupled to the light distribution system 26 which is split into subtransmission lines according to the desired illumination in the various compartments. Each of the subtransmission lines is coupled to its own light extractor and light is distributed within the refrigerator as desired.

While in the above description the uses of optical fiber bundles was described as means to transmit the light to various points of use, one should understand that other means of light distribution can be used as well. For instance, the light distribution element 26 and its subtransmission lines 29, 30, 31, 32 and 33 can be consolidated together with the compound parabolic concentrator into a single manifold element which is molded from an optically transparent material such as PMMA and then coated with a lower index of refraction material such as THV. This approach is particularly useful in mass-produced systems where the cost of the mold is justified in view of the reduction in the cost of the assembly and the lower labor content achieved by consolidating all these elements into one molded element. An additional advantage to this approach is the reduction of optical losses incurred when using fiber bundles, due to reflection at the various interfaces and packing losses due to the finite thicknesses of the fibers' cladding and light impinging on the interstitial spaces between the fibers.

In some embodiments of the invention, it may be desired to provide illumination of compartments or even convert shelves to light source. Specifically FIG. 4A shows a top view of a light shelf assembly 80. The shelf 81 is made of a flat piece of dielectric material such as, but not limited to, glass, polymethylmethacrylate or polycarbonate. The choice depends on the application. In most cases one would want to emit light in only one direction, i.e. from the working surface. In other applications it may be desired to have light emitted from both faces of the plate. The light source 82 is positioned outside the refrigerated zone, and its light is collected into an optical fiber bundle 84 with the help of concentrating optics 83, and then the optical fibers are brought to the edge of the plate 81.

To facilitate the interface between the fibers and the plate, a number of approaches can be taken. If we want this interface to be permanent, we use a long ferrule 85 which in essence is an extruded piece of plastic with holes at predetermined locations. The holes are spaced to face the narrow end of the extraction zones 86 and their diameters accommodate the individual transmission fibers. The fibers can be permanently cemented with a special index-matching optical epoxy through the holes in the ferrule to the edge of the transparent plate. Such a light extractor would be selected for permanently fixed fixtures in a refrigerator, for instance the ceiling of a meat compartment, or other fixed elements that need to illuminate a space usually not accessible to an outside light source.

Figure 4B:
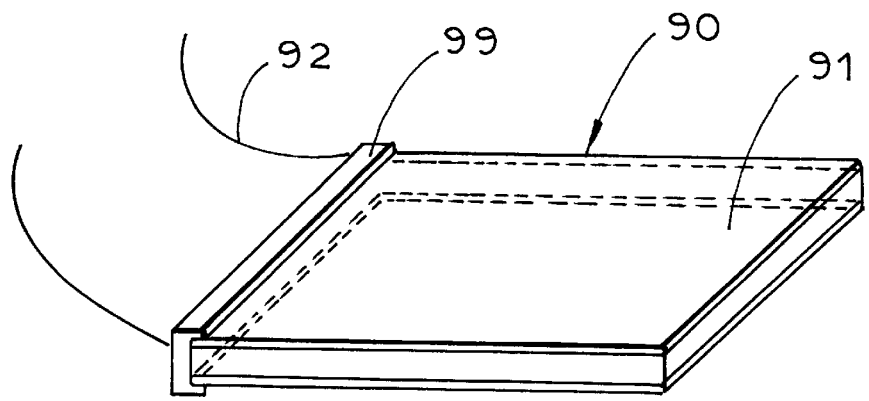
Figure 4C:
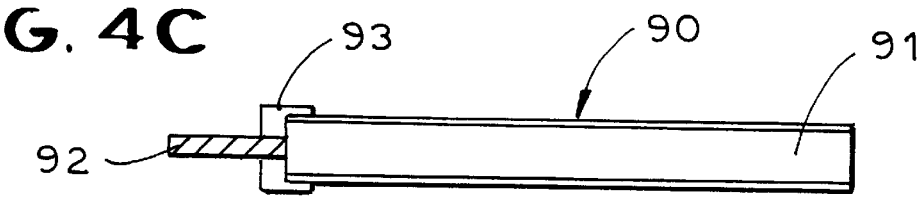
Figure 4D:
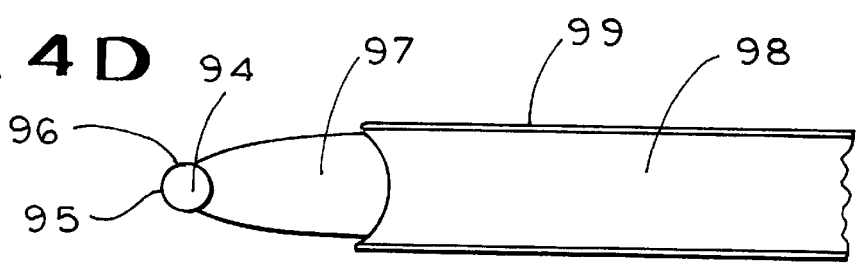

One can also design the ferrule to be a "snap on" unit, with the optical fibers cemented to the ferrule itself, to allow greater design modularity and easy connection and disconnection of the fiber bundle to thy edge of the light shelf. The result is an optical connector. It should be borne in mind that in such a connector, optical losses of up to 8% of the total light flux can be incurred. These can be somewhat lowered, but this will require the use of an optical silicone "grease". Such an embodiment is shown in FIG. 4B, where a perspective view of a light shelf 90 is shown, the light extraction element 91 is connected to a fiber bundle 92 via a snap-on ferrule 93. FIG. 4C is a cross section through the light shelf 90 presented in FIG. 4B.

FIG. 4C shows another embodiment in which the coupling of the light from a sub-bundle to a light shelf is achieved in the following manner. Light from the sub-bundle (not shown) is injected into a cylindrical light extractor 94 having a variable index of refraction extraction zone 95 along its length and a cladding 96 around the balance of its circumference. Because of the lens action of the cylindrical light extractor, light emanates within a relatively narrow beam about the normal to the light extraction zone 95. Opposite the light extraction zone a linear compound parabolic concentrator 97, preferably made of a solid dielectric, is fastened. This compound parabolic concentrator is of the $\theta_i/\theta_o$ type (see "High Collection Non Imaging Optics" by W. T. Welford and R. Winston, Page 82, Academic Press, 1989) and is used in reverse fashion. The accepted nomenclature is that i denotes the input of a concentrator and o is output, despite the fact that in this instance the concentrator is used in reverse, namely by having the light entering at a relatively large angle and narrow aperture from the light extractor 94 and injecting the light into a larger aperture and smaller angle (the angle of acceptance of the light shelf 98). Thus the angle $\theta_o$ is the angle of light emission from the extractor 94 (about 60°), and $\theta_i$ is the acceptance angle of the shelf (about 30°). Both of these angles depend on the actual selection of the materials for the core and clad of both the linear light extractor 94 and the light shelf 98. For the angles cited, which correspond to a core of the light shelf 98 made of PMKA (index of refraction of about 1.5) and a silicon polymer cladding 99 (index of refraction of about 1.4), the concentration ratio would be about 1.73 and thus the thickness of the light shelf would be 1.73 times the diameter of the cylindrical light extractor's diameter. The light extractor 94 with the linear compound parabolic concentrator 97 are fastened to the structure of the appliance, while the shelf 98 can be made to move back and forth along a plane passing through its center and the center of the light extractor. When the shelf is pressed against the output of the compound parabolic concentrator, most of the light is injected into the shelf and extracted from the shelf as described above. This is an example where a light extractor 94 is actually used as a light powering means for another light extractor, the light shelf 98. This allows easy coupling of the light source and the light shelf.

Figure 4E:
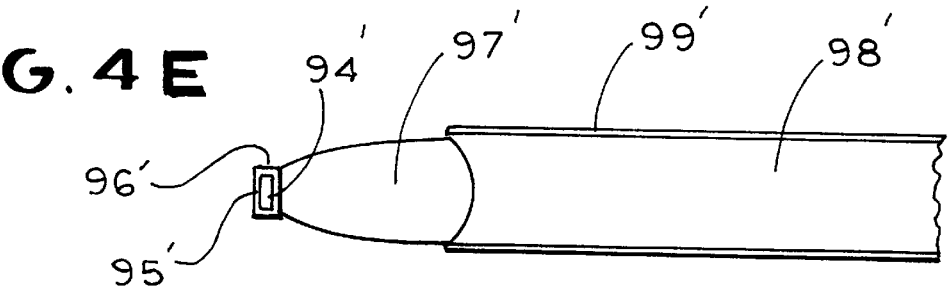

Another method of coupling a light shelf to the light distribution system is shown in FIG. 4E, where I use a planar wave guide 94' as a light extractor to power the light shelf 98. Since the light emitted from the planar wave guide 94' is lambertial, the angle $\theta_o$ is 90°, and thus the concentration ratio of the compound parabolic concentrator 97' needs to be increased to 2.

Figure 4F:
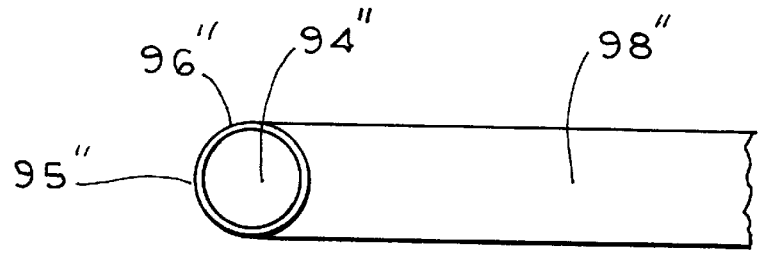

When I use no cladding on the light shelf, as shown in FIG. 4F, then the angle of acceptance of the light shelf increases to 90°, which is a larger angle than the angle of emission from a cylindrical light extractor 94", and thus no concentrator is required to couple the light shelf 98" to the light extractor 94", resulting in the use of a thinner shelf or larger diameter cylindrical light extractor 94". Similarly, when a cladding-less shelf is used, one can illuminate its entry edge with a linear planar wave guide such as 94' without the use of an intermediating compound parabolic concentrator.

One should mention that it is always desired to inject the light from the sub-bundles into each of the light extractors within the angle of acceptance of the light extractors. Usually one would provide fibers and extraction plates that have similar core and cladding respective indices of refraction, or where the angle of acceptance within the light extractor is larger than within the light distribution system. For instance, if the light extractors are made of PMMA (index of refraction of about 1.5), then the fiber's cores or the core of the light distribution manifold would be made from a material having a similar index of refraction, if their respective claddings have the same index of refraction. If the cladding of the light extractor has a smaller index of refraction than the cladding of the light distribution system (for instance an unclad element), then the core of the light distribution system can have a larger index of refraction.

When light shelves are considered, in some embodiments of the invention, it may be desired to have light emitted only from one side of the shelf, while in other embodiments it may be desired to have both sides of the shelf as working surfaces emitting light. In the former case, the virgin plate (glass or polymer) can be painted with hyperbolic stripes on its back plane, using a lambertially reflective paint. The paint used needs to be selected carefully, taking into account its optical properties, its adhesion to the substrate and its immunity to subsequent processes.

The whole plate is then coated with a very thin (as thin as 10 microns) fluoropolymer or silicon-based polymer, whose index of refraction is appreciably lower than the index of refraction of the plate itself. The result is a cladded wave guide. Light that impinges on the extraction zone is reflected into a lambertial distribution and most of the reflected light is outside the angle of acceptance of the wave guide, and thus is extracted from the top surface. Some light is reflected back from the top surface, and if it is within the angle of acceptance of the wave guide, it will be extracted further down the wave guide, otherwise, it can be emitted from the bottom surface. If it is desired to completely eliminate any light emission from the bottom part of the wave guide, I can simply apply (on top of the cladding) a coating of the same while reflective paint (or another reflector) and all light is emitted in one direction. The cladding has thus two functions. It separates the two white paints (the stripes on the back plane and the external white paint) and it also assures that accidental damage to the virgin (core) surface does not cause deterioration, in time, of the light extraction properties imparted by the specific light extraction system designed.

In the latter case, when light is to be emitted from both sides of the shelf, thus having both sides as working surfaces, I can assemble two plates with their backing facing each other and inject light to both plates. In a simpler and lower cost approach, in lieu of painting white lambertial reflector extraction zones, I can abrade the surface of the core according the desired shape, and then apply the cladding; light is then emitted on both sides of the plate. The nature and microstructure of the abraded surface will control (to some extent) the partition function of the light between the two surfaces. When we use glass as the medium of the wave guide core, a cladding is not necessary when I want light to be emitted from both sides. In this case, air serves as the "cladding" material. One can use standard lithographic methods with HF etching to obtain the correct extraction zones.

Another embodiment of the invention is shown in FIGS. 5A and 5B. Here the inner walls of the refrigerator are converted to a light-extraction system. In this embodiment the refrigerator 100 has a light-transmitting plastic 101 as its inner shell on which are embossed appropriate light-extraction zones, 102 (where light emission is desired). Since in most cases the mold surface is on the outer element of the shell (facing the refrigerator insulation 103), only the existing mold need be modified without the addition of production steps or additional embossing equipment. The embossed extraction zones are simply roughened surfaces which reflect light lambertially, unlike the nonembossed surfaces that act as a wave guide and cause total internal reflection of light. The outer side of the shell is now covered with a cladding material 104 having an index of refraction lower than that of the transparent shell. One can paint the outer side (facing the insulation) with a white paint to provide the preferred white appearance of the refrigerator internal space, as well as to recover that part of the light which is reflected back from the front surface of the transparent shell. Light impinging on the embossed extraction zone will be partially extracted from the inner surface into the refrigerated zone and partially reflected from the back white paint. It should be clear that laminating the external surface with an appropriate reflective plastic sheet (such as a titanium oxide loaded PVC, or a while fluoropolymer) would result in similar performance. At selected locations (close to the light source 106) light injection mounts, or other means of coupling the sub-bundles 107 to the shell at a corner of the inner shell 105 would be provided in order to inject light into the shell which will be extracted by the extraction zones integrated within the shell.

It should be clear, however that in lieu of embossing the extraction zones, one can simply silk screen a highly reflective (lambertian) white paint as described earlier for discrete extraction zones. While in FIG. 5A extraction zones are shown only on the back walls of the refrigerator, it should be clear that one can provide for such extraction zones on other walls as well. One of the advantages of converting the inner shell of a refrigerator to a light extractor is an increase in the usable space available. In the current state of the art, lamps positioned within the refrigerator space are often protected by a translucent screen which causes an appreciable portion of the refrigerated space to be unusable. This screen is required to protect the lamp from breakage and avoid direct contact with stored goods.

Similarly, in FIGS. 2A and 2B, extraction zones positioned vertically in the center of the enclosure are described, but other positions are feasible as well. For instance, one can position linear light extractors at the corners of the enclosure. Such an arrangement would be particularly beneficial for commercial refrigeration units (vertical as well as horizontal) where the light extractors would simply replace existing fluorescent lights while providing more efficient, safer and operationally economical lighting systems.

In some embodiments of the instant invention, it may be desired to have a dual light-source arrangement, whereby one light source is used to illuminate (in the visible part of the spectrum) the goods, while another light source provides for ultraviolet light that can be activated when the door is closed to provide for the bactericidal effect of the UV light. One method of operating such a dual-lighting system would be to position the two light sources side by side, on a movable rack. When the door is closed, the UV source is powered on and faces the concentration optics, while the opening of the door shuts off the UV source and activates the visible light source while simultaneously moving the rack to position the visible light source in front of the concentration optics. Such a dual-light source is not practical in the current state of the art since one would need to provide for doubling the cost of the electrical harness for the system, and furthermore, when leaving a UV light source continuously operational within the refrigerated space, the power required to operate the source is doubled, since all the heat generated in the refrigerator from the light source needs to be withdrawn by the refrigeration unit at an additional power loading at least as large as the UV source's power rating.

Dual light sources can also find applications in commercial applications, even when transparent glass doors are used to provide access to the goods stored. All that one needs to do to protect the public is switch the UV source off when the door is opened and provide a glass door that reflects or absorbs the UV part of the spectrum. When simultaneous lighting with both UV and visible light is desired, such as in commercial refrigeration units, one can simply intermix the transmission lines from both light source to power each of the light extractors.

It should be appreciated that light extractors can be made very thin (as thin as the total cross section of the powering fibers), and thus no space penalties are incurred. Furthermore, the light extractors are rugged and can be washed directly and one need not worry about accidental contact between the light extractors and stored goods.

FIG. 6 shows another embodiment of the invention, specifically, the internal illumination of a clothes washing machine 110, from a single light source positioned outside the part of the machine where water flow would interfere with the proper operation of a normal light source. Only the essential elements of the washing machine pertinent to the present invention are shown.

For simplicity of the schematic drawing, the light source 111, with its optical concentrator assembly 112, and the optical fibers bundle 113, are shown positioned on the outside of the washing machine's drum 114. A preferred position would be one of the front corners of the washing machine, so that a small latch could provide for easy access to the light bulb, in case the need to replace the bulb arises.

Figure 9F:
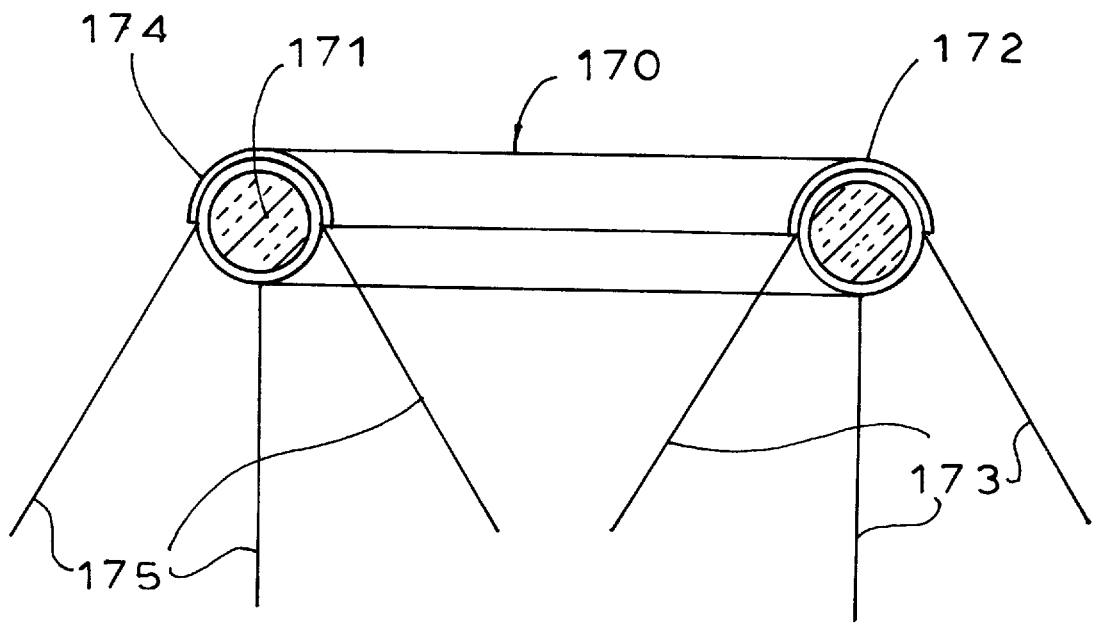
Figure 9G:
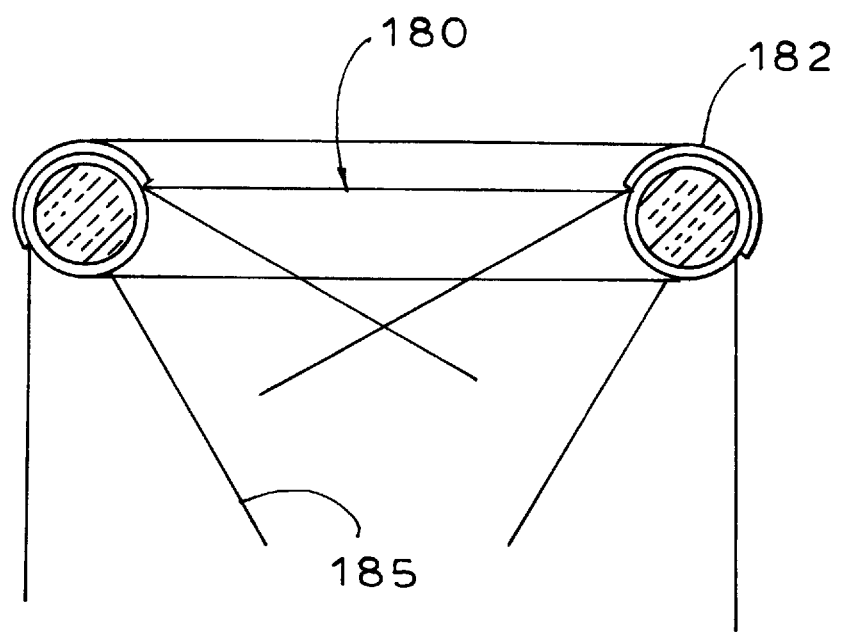

In this embodiment, the optical fiber bundle 113 is split into two parts, a sub-bundle 115 which powers a toroidal or a circular light extractor 117 and a second sub-bundle 116 that can be used to power a light extractor behind an instrument panel 119. The toroidal or circular light extractor 117 is attached to the bottom part of the top of the machine 118, thus allowing the free closure of the cover (not shown). A particularly useful toroidal light extractor is described in FIGS. 8A and 8B, with a cross section as shown in FIG. 9G. This light extractor, as will be explained below, delivers most of its light within the washing machine drum, thus allowing for good visibility of the inside of the drum. In this manner illumination of the inside of the washing machine is enabled without having to expose the electrical contacts and the bulb to the severe environment within the machine. Details and a number of different embodiments of the toroidal or circular light extractor 117 are provided below and described in FIGS. 8A to 8D and FIGS. 9A to 9G.

It should be clear to a person trained in the art that while herein is described the embodiment in a top-loaded washing machine, the general approach disclosed for the remote illumination inside the appliance, is applicable to washing machines of other designs, such as a front-load washing machine or industrial and commercial washing machines as well. To demonstrate the invention in appliances with side loading, FIG. 7 shows an embodiment of the invention in a typical side-loaded clothes dryer 120. As above, only the pertinent elements of the dryer to the present invention are shown. The light source assembly 121 is positioned outside the machine drum, and the optical fibers bundle 122 is brought through a seal in the fixed back wall 123 of the drying drum. The rotating drying drum 124 rotates against a seal 125 between the drum and the fixed back wall. The circular light extractor 126 is fastened to the fixed back wall 123 and thus internal illumination of the inside of the appliance is enabled. One can also fasten linear light extractors 128 to the inside part of the door 129 of the dryer as well, since the optical fiber bundle is sufficiently flexible to accommodate the opening and closing of the door. As above, one can use part of the light budget from the light source 121 to illuminate other objects such as an instrument panel by positioning behind such a panel a linear light extractor powered by a sub-bundle from the bundle 122.

FIGS. 8A to 8D illustrate a number of circular light extractors that can be used in conjunction with the present invention. In FIG. 8A the circular light extractor 130 is made of an optically transparent open ring 131 having its open ends 132 terminated with an optical connector 133, through which light is injected into the ring from fibers 134, so that half the light is directed to the right side and the other half to the left side of the ring. A cross section through the line A—A of the light extractor 130 is shown in FIG. 9A. A light extraction zone 135 is applied to the bottom of the ring, then a cladding 136 is applied to the external surface of the ring, and finally an additional reflector 137 is applied outside of the cladding. In some embodiments of the circular light extractor described in FIGS. 8A and 9A, the working surface 138, from which light is emitted, is not treated with a cladding material. In yet other embodiments, the white reflector 137 as well as the cladding is eliminated altogether. The main purpose of the cladding is to allow the application of the outer reflective paint (without having this paint extract light from the core 131 of the circular light extractor), and in some embodiments, it is not very important to recapture the extracted light reflected in the backward direction from the working surface of the extractor. This back reflection rarely amounts to more than 5% of the total light flux, and the costs associated with recapturing the back-reflected light with the cladding and back reflector, are not always justified.

FIG. 8B shows an embodiment having the same cross section A—A as that of FIG. 8A (FIG. 9A), the difference is that the circular ring 141, is closed, and part of the ring is removed to allow a better coupling (essentially in the direction of the circle's tangent) of the optical fibers 142 to the circular ring.

FIG. 8C shows yet another embodiment of a circular light extractor 150. In this embodiment, light is launched into the ring radially from the central circumference of the ring 151, through an optical connector 152, through which a plurality of optical fibers 153 deliver the light. Cross sections A—A and B—B of the circular light extractor 150 are given in FIGS. 9C and 9B respectively. The geometry of the light extraction zone 154 is calculated according to principles taught in the aforementioned patent, taking into account the changing diameter of the ring in the direction of light propagation. As described above, a cladding 155 can be applied to the ring after application of the extraction zone and then an additional reflector 156 can be applied. The inner ring, however, at least at the points of light injection, is kept free of the white reflector 156 to allow entry of the light into the circular light extractor. One can also leave the outer rim of the circular light extractor free of the outer reflective layer to allow residual light emission radially from that rim. As above, the clad and the outer reflector can be eliminated if the efficiency of unidirectional lighting is not of paramount importance.

FIG. 8D shows yet another embodiment of a circular light extractor 160. In this embodiment, light is launched into the ring radially from the outer circumference of the ring 161, through an optical connector 162 through which a plurality of optical fibers 163 deliver the light. Cross sections A—A and B—B of the circular light extractor 160 are given in FIGS. 9E and 9D respectively. Except for the direction of launching the light into the circular light extractor, this embodiment is equivalent to the one described in FIG. 8C. This embodiment is particularly useful when the inner diameter of the ring is small or absent, namely a disc-like light extractor is provided.

Each of these circular light extractors can be designed to operate in such a manner that light emanates from both surfaces. When this is desired, the light extractor is an etching of the core and no back reflector is used, as described earlier for light shelves.

A special circular light extractor has a toroidal shape, its bottom view (the surface on which the extraction zone is applied) can be the same as in FIGS. 8A or 8B, namely an open toroid or a closed toroid with a variable cross section lambertially reflective extractor. Furthermore, as will be explained below, a fixed width variable index of refraction cladding can also be used as the extraction zone, and the cross section A—A as in either FIG. 9F or 9G. Specifically, FIG. 9F shows a cross section through a toroidal light extractor 170, having a solid toroidal core 171, made of an optically transparent material. An extraction zone 172 is applied to a surface generally opposed to the surface from which light is desired. Then a cladding is applied to at least half the cross section that includes the extraction zone 172, but application to the total surface can be practiced as well. On top of the cladding a reflective layer 174 (either lambertial or specular), is applied having a cross section which is at least as large as the largest cross section of the previously applied extraction zone 172. In a preferred embodiment this reflector covers half the toroid cross section. Light injected (for instance from fibers 134 or 142 in FIGS. 8A and 8B respectively) into the toroid propagates along the axis of the toroid (in opposing directions when injected from both sides) by the process of total internal reflection, except that light which impinges on the extraction zone is extracted by the lambertial reflector of the extraction zone. By controlling the width of the extraction zone along the direction of propagation according to the teachings of the aforementioned patent, a controlled rate of extraction from the toroidal light extractor is achieved. Furthermore, unlike the lambertial distribution from flat circular light extractors, the light emanating from the toroidal light extractor is emitted in a relatively narrow beam (denoted by the rays 175). The angle of emission depends on the index of refraction of the core and the cladding of the toroidal light extractor.

In a similar embodiment, a toroidal light extractor 180 in FIG. 9G has its light extraction zone 182 placed at an angle to the vertical axis of the toroid, thus directing the extracted narrow light beams's central axis of symmetry 185, at the same angle to the toroid vertical axis of symmetry. It should be clear that both inward light beams (as described in FIG. 9G and outward light beams (if the extraction zone was placed off axis on the toroid's outer surface on a circle smaller than the toroid axial circle) are feasible.

While in all the circular light extractors described above, variable width lambertian extraction zones have been described, it should be clear that a variable index of refraction cladding as described above (FIG. 3E) could be used as well. In the case of the ring, or planar circular light extractors, this cladding will cover the whole nonworking surface of the ring (namely the surface from which light is reflected to be emitted from the opposing surface). In the embodiments described in FIGS. 8A and 8B, the index of refraction would increase from a value well below the core's index of refraction from the point of light injection to a value somewhat above the index of refraction of the core at the opposing midpoint of the ring. As in FIG. 3E, it is best to include in the cladding a light dispersing medium, and if unidirectional illumination is desired, back the cladding with an appropriate reflector which is either lambertial (diffuse) or specular (nondiffuse). Similarly, in the embodiment described in FIG. 8C, the index of refraction would increase from the inner rim to the outer rim and in the embodiment of FIG. 8D from the outer rim to the inner rim. In both latter cases, the index of refraction of the cladding on any given radius would be constant for all point on the radius.

In the toroidal embodiments, however, the cladding with the variable index of refraction should occupy no more than half the cross section of the toroid and have a constant cross section along the toroid. In those cases where narrower light distributions are desired, a thinner constant cross section may be used. The ratio of the variable index of refraction cladding's minimum width to the toroid's cross section and its circumference is determined by the toroid's aspect ratio, namely, the toroid's inner circumference's radius divided by its cross sectional radius. The larger this aspect ratio, the smaller can the minimum width of the variable index of refraction cladding be. This, since if the propagation distance of the light in the toroid (the circumference of the toroid) is sufficiently large, all rays will eventually interact with the variable index of refraction cladding strip. However, if the aspect ratio is small, it is best to have the variable index of refraction cladding cover half the toroid's cross sectional circumference to assure that in the short distance the light has traveled it has interacted with the variable index of refraction cladding and the correct proportion of the light was extracted. It should be mentioned here that angulated extraction zones based toroidal light extractors are best implemented with the variable index of refraction cladding.

Figure 10B:
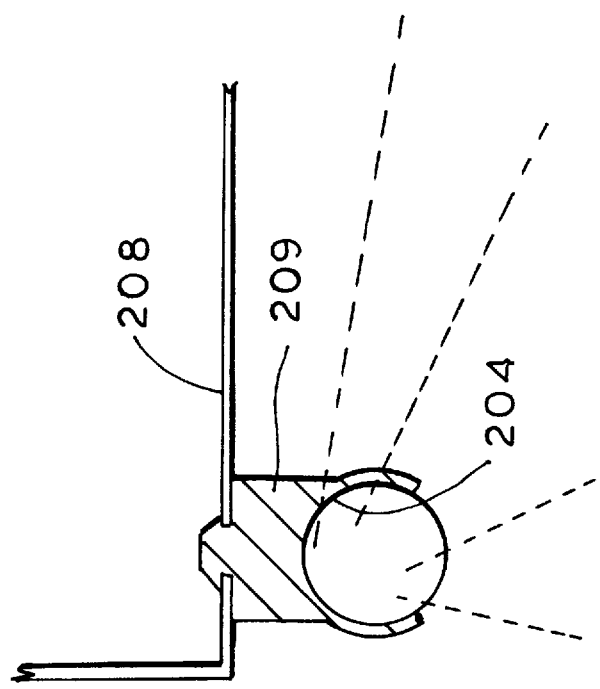
FIGS. 10A is a perspective view and FIG. 10B is a detail which shows segments of a microwave oven illuminated according to the present invention.
Figure 10A:
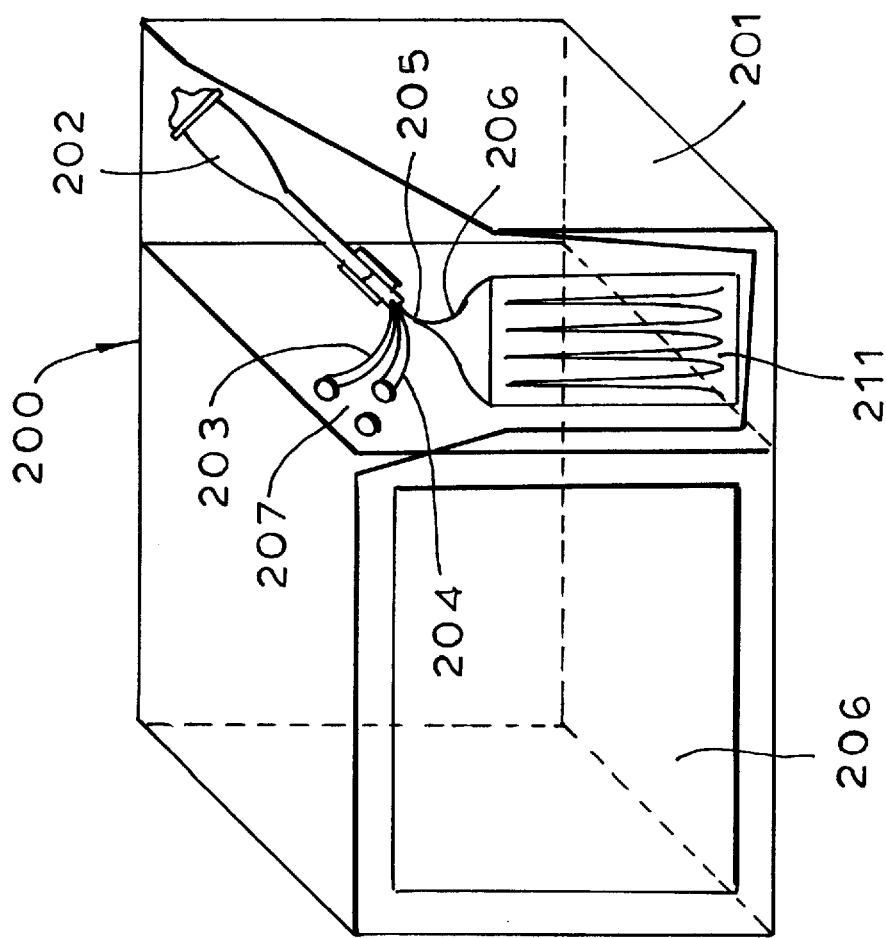

In yet another embodiment of the invention, remote illumination is provided to illuminate the working space of a typical microwave oven. In the current state of the art microwave ovens, a lamp is positioned behind a Faraday screen to allow penetration of light into the working microwave cavity. As a result, the screen blocks the majority of the light and observation of the heating and cooking process through the front door (which has its own Faraday screen) is very difficult. This approach is taken since both the light bulb and the bulb's socket and electrical leads are conductors and are shortened by the microwave's electrical field. The microwave blocking Faraday screen separating the light bulb from the microwave cavity has perforations that are typically 2 to 3 mm in diameter. FIG. 10A shows schematically a microwave oven 200 with the power and control compartment 201, exposed (and without the front door). A light source assembly is fastened, for instance to the top right corner of the compartment, and is terminated with a number of optical fiber sub-bundles 203, 204 and 205 (only three-sub-bundles are shown). Typically, the sub-bundles 203 and 204 dedicated to illuminate the microwave working cavity 206, would be relatively large diameter fibers (2 to 3 mm to allow each free passage through one of the perforations in the Faraday screen 207). Typically, between one to four such large diameter fibers would be used. FIG. 10B shows the typical positioning of the distal end of a larger diameter fiber 204. The fiber is fastened to the ceiling 208 of the microwave cavity with plastic fasteners (preferably transparent), such as the fastener 209. The distal end of these fibers is treated with an extraction zone which is somewhat smaller than the microwave cavity dimension (along the light extractor's axis), thus light is emitted from the fiber only within the cavity and within a narrow beam of between 60° and 90°, as shown in FIG. 10B. The sub-bundle 205 would typically consist of a plurality of smaller diameter fibers arranged in an optical connector 210 which is coupled to a planar light extraction 211 to be used as a back lighting system for the instrument panel. Since the parts of the illumination system (the distal ends of the large diameter fibers) are made of dielectric materials having negligible dielectric losses, the present illumination system is fully compatible with the presence of microwave radiation within the cavity during use of the working space, and a more efficient use of the light resources available is made thus providing improved illumination of the working space.

It should be clear to a person trained in the art that other embodiments of a remotely illuminated microwave cavity in which planar or circular light extractors are used are feasible as well and that the above illustration using large diameter fibers with their distal end treated to be light extractors is used only for demonstration of the principles of the instant invention.

Figure 11:
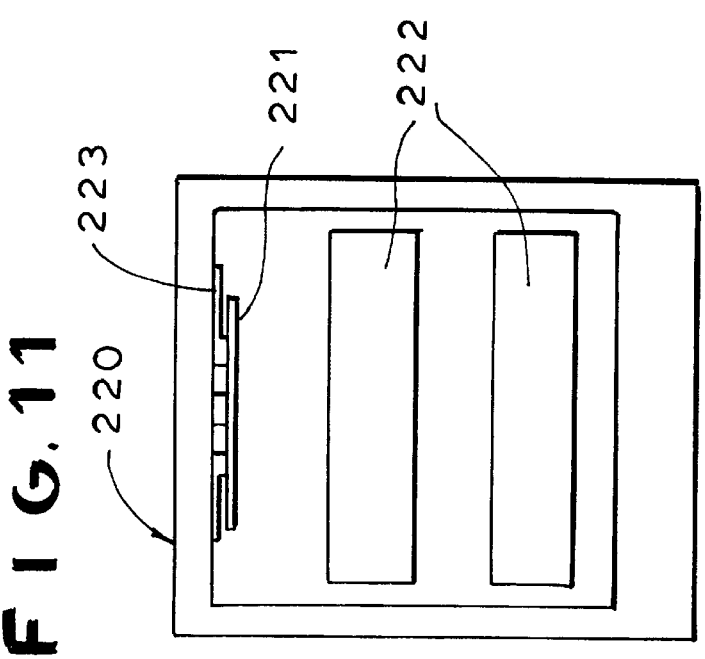
FIG. 11 is a cross section of a dish washing machine illuminated according to the present invention.

Yet another embodiment of the invention is presented in FIG. 11 where a cross section through a typical dish washing machine 220 is depicted. A washing machine has typically a rotating water spraying system, and movable trays 222. The operational environment is very wet and any light source of the state of the art would need to be protected from this environment resulting in poor illumination. In the instant invention a light extractor 223 is fastened to the ceiling of the washing machine (or on any, or all the side walls, not shown) and is powered from a light source outside the working chamber of the dish washer in a manner similar to that described earlier for a refrigerator. Since only plastic or glass elements are within the working cavity and all the electrical parts of the system are outside of the working cavity, there is no danger of short circuits or deterioration of the electrical circuit due to corrosion from the water and soap in the dish washer and thus efficient illumination of the working cavity is enabled.

Figure 12:
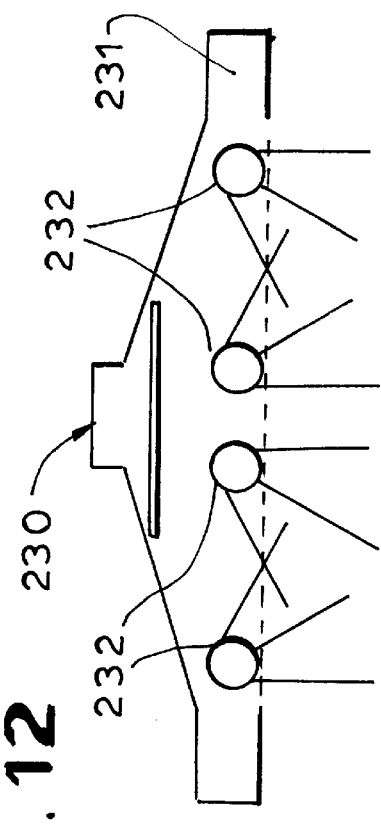
FIG. 12 is a cross section through a range hood illuminated according to the present invention.

Yet another embodiment of the invention is shown in FIG. 12, where direct illumination of the space under a range hood 230 is provided with a light source that is not exposed to the range's fumes and that can be easily cleaned without encountering possibly hazardous electrical contacts. In this embodiment, a light source is positioned in an enclosure 231 on the side of the hood, and only optical fibers (not shown) and light extractors are exposed to the cooking environment. The light extractors can be a linear light extractor, large diameter fibers, circular light extractor or toroidal light extractors as shown in FIG. 12. As mentioned above, the toroidal light extractors can be designed to deliver most of the light within a narrow space above the cooking area, while linear light extractors or normal circular light extractors provide lambertial distribution of the light resources.

Figure 13:
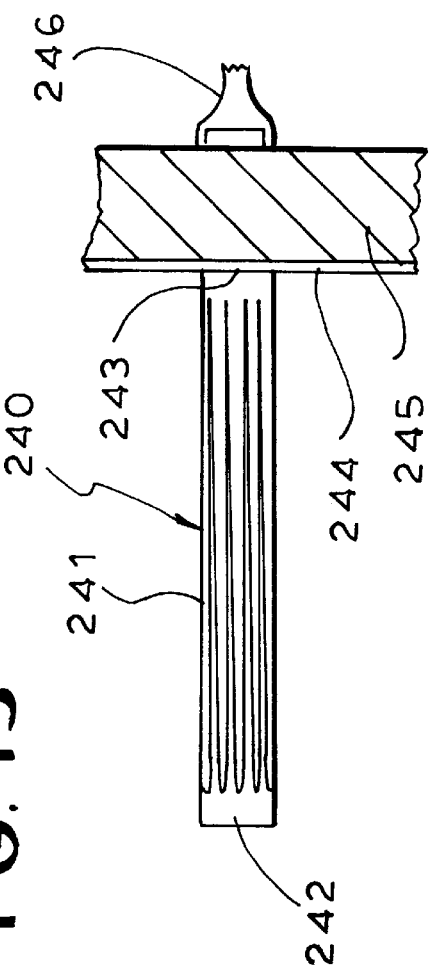
FIG. 13 shows a portion of an oven remotely illuminated according to the present invention.

A special challenge is encountered when designing an illumination system for ovens and ranges (electrical as well as gas powered), since the temperatures in a range can be as high as 600° F. The existing state of the art requires the positioning of a light bulb outside the heated space, behind a massive protective lens and requires high cost porcelain seats, furthermore, only a small portion of the light generated is actually delivered to the range's working space, due to the fact that the lamp is deeply recessed beyond the range's insulation. In FIG. 13, a segment of an oven 240, where the remote illumination of the instant invention resolves the shortcoming of the prior art is shown. A light extraction plate 241, made of an optically transparent material that can withstand the oven's highest expected operating temperature is provided. Such a material can be quartz, Vicor, Pyrex or other heat resistant transparent glass. An extraction zone 242 is either etched or glazed (white lambertian reflector glaze) on the back side (facing the oven's inner wall), while leaving on the proximal side of the light extractor an area 243, sufficiently long free of the extraction zone to allow light propagation without extraction. This free of extraction zone area is used to pass the extraction zone through the oven's wall 244 and the oven's insulation 245 thus having the optical connector 246 outside the insulation and thus at temperatures much lower than inside the oven. The light extractor's proximal end can be bent at 90° to reduce the extent of protrusion, albeit the angle of curvature of this bent should be large enough to prevent excessive optical losses at the curve. Typically the radius of curvature should be larger than 8 times the waveguide's thickness. A light source and its associated optical concentrator and optical fiber bundle can be positioned within the instrument panel since its total cross section would not exceed 1.5" (for instance an MR-11 type halogen lamp).

While I have described a number of embodiments here, it will be understood that all of the features specific to one embodiment can be used, to the extent compatible, in any other and that the invention also embraces all new and unobvious features individually and in combination within the spirit and scope of the appended claims.

I claim:

1. An appliance comprising:
    an appliance housing defining an interior chamber at least partially closed by said housing;
    an electric power connection to said appliance for electrically energizing said appliance by supplying electrical energy thereto, said chamber having walls;
    at least one lamp in said housing outside said chamber and supplied by said electric power connection with said electrical energy;
    light-transmission means illuminated by said lamp and extending to at least one of said walls for delivering light to said chamber from said lamp; and
    light-extraction means extending along at least one of said walls optically coupled to said light-transmission means and located in said chamber for emitting light transmitted to said light-extraction means in a direction generally transverse to a light-propagation direction therealong to illuminate said interior chamber.

2. The appliance defined in claim 1 wherein said one of said walls is composed of a light-transmissive material and forms a light wave guide, said light-extraction means including a pattern of surface formations on said light wave guide emitting light therethrough.

3. The appliance defined in claim 1 wherein said light-transmission means includes a plurality of optical fibers and at least one of said fibers extends along said one of said walls and said light-extraction means comprises formations provided on said one of said optical fibers.

4. The appliance defined in claim 1 wherein said light-extraction means includes a light wave guide having a pattern of surface formations in the form of at least one of:
    a pattern of roughening on an outer surface of the light wave guide;
    a pattern formed by a lambertial reflector;
    a pattern formed by a variable index of refraction cladding for an outer surface of said light wave guide;
    a pattern formed by a pattern of specular reflectors on roughenings of said light wave guide;
    a pattern of embossment of an outer surface of said light wave guide;
    a pattern of embossment of an outer surface of said light wave guide covered with a cladding; and
    a pattern of embossment of an outer surface of said light wave guide covered with a cladding and then a reflector.

5. The appliance defined in claim 1 wherein said light-extraction means is a shelf of light-transmissive material received in said chamber, said light-transmission means including a plurality of optical fibers, at least one of said fibers terminating at said shelf and being in optical communication therewith.

6. The appliance defined in claim 1 wherein said light-extraction means includes an elongated light-transmissive wave guide in optical communication with said light-transmission means and a cladding having an index of refraction varying along a length of said light-transmissive wave guide.

7. The appliance defined in claim 1 in the form of a cold-storage appliance having a refrigerating unit for cooling said chamber, and at least one fan.

8. The appliance defined in claim 7 wherein said lamp is provided in a region of said fan so as to be cooled thereby.

9. The appliance defined in claim 1, further comprising a control panel on said housing, said light transmission means having a branch running to said control panel separately from said wall for illuminating said control panel separately from said wall.

10. The appliance defined in claim 1, further comprising a light-concentrating optical system between said lamp and said light-transmission means.

11. The appliance defined in claim 1, further comprising rotating means in said chamber to treat articles disposed therein with a fluid, said one of said walls being fixed and having an aperture through which said light-transmission means passes, said appliance further comprising sealing means around said light-transmission means providing a waterproof seal therefor.

12. The appliance defined in claim 11 wherein said light-extraction means includes a circular member mounted on said one of said walls.

13. The appliance defined in claim 1 wherein said housing is provided with a microwave generator for exposing an article within said chamber to microwaves, said walls being metallic and said one of said walls being provided with Faraday perforations through which said light-transmission means passes, said light-transmission and light-extraction means being composed of a material transparent to microwaves.

14. The appliance defined in claim 13 wherein said light-extraction means is a distal end of said light-transmission means.

15. The appliance defined in claim 1 wherein said chamber is a cooking chamber provided with a heater for heating an article therein, said light-extraction means being composed of a heat-resistant material.

16. The appliance defined in claim 1 which is a clothes drier.

17. The appliance defined in claim 1 which is a clothes washer.

18. The appliance defined in claim 1 which is a dish washer.

19. The appliance defined in claim 1 which is a cooking stove.

20. The appliance defined in claim 1 which is a refrigerator.

21. The appliance defined in claim 1 which is a freezer.

22. The appliance defined in claim 1 which is a microwave oven.

23. The appliance defined in claim 1 which is a range hood.

24. An article of manufacture comprising:

housing means defining an at least partially enclosed space;

at least one light source in said housing means outside said space;

light-transmission means optically coupled with said light source for conducting light toward said space; and an elongated light wave guide extending along said space, optically coupled with said light-transmission means, and provided with light-extraction means extending over at least a portion of said wave guide for extracting light therefrom to illuminate said space.

25. The article of manufacture defined in claim 24 wherein said light-transmission means includes optical fibers.

26. The article of manufacture defined in claim 24 wherein said light-transmission means includes a manifold.

27. The article of manufacture defined in claim 24 further comprising means for removing infrared radiation from light emitted from said wave guide.

28. The article of manufacture defined in claim 24 wherein two sources of light are provided of different spectral characteristics, said sources being optically couplable selectively to said light-transmission means.

29. The article of manufacture defined in claim 24 wherein said wave guide is a structural element of said housing means.

30. The article of manufacture defined in claim 24 wherein said wave guide is a shelf.

31. The article of manufacture defined in claim 24 wherein said wave guide is in the form of at least one of:

a planar light extractor, a cylindrical light extractor, a circular light extractor, a disk light extractor, and a toroidal light extractor.

32. A method of apportioning light resources in an appliance having a chamber which is at least partially closed, comprising the steps of:

(a) coupling at least one light source located outside said chamber with a light-transmission means and piping light by said light-transmission means to said chamber;

(b) subdividing light piped to said chamber along respective paths through said light-transmission means to illuminate respective areas of said chamber with respective light fluxes and providing respective light-transmission cross section of said light-transmission means for the respective paths in accordance with said fluxes; and (c) distributing light in said areas by coupling ends of the paths of said light-transmission means to respective light extractors at said areas and emitting light along lengths of said light extractors at said areas.

33. The method defined in claim 32, further comprising the step of removing an infrared component from light emitted into at least one of said areas.

34. A method of inhibiting microorganism growth in an enclosed space, comprising the steps of:

(a) producing ultraviolet light at an ultraviolet light source at a location outside said space;

(b) supplying-said ultraviolet light to said space by coupling a light-transmission means with said source outside said space and piping said ultraviolet light to said space with said light-transmission means; and (c) emitting ultraviolet light in said space from a light extractor optically coupled to said light-transmission means.

35. A light-emitting shelf comprising:

a shelf formed as an elongated light wave guide and disposed in a space;

means for coupling said shelf with a light source; and light-extraction means extending over at least a portion of said wave guide for extracting light therefrom to illuminate said space.

36. An illuminator comprising:

a bent elongated light wave guide extending over most of an arc of a circle;

means for coupling said wave guide with a light source; and continuous light-extraction means extending over at least a portion of said wave guide for extracting light therefrom to illuminate a space.

37. The illuminator defined in claim 36 wherein said wave guide has a substantially toroidal shape.

* * * * *